United States Patent Office 3,184,495
Patented May 18, 1965

3,184,495
PROCESS FOR THE PREPARATION AND RECOVERY OF TRIMETHYL PHOSPHITE AND DERIVATIVES THEREOF
Charles F. Baranauckas, Niagara Falls, Russell L. K. Carr, Grand Island, and James J. Hodan, Tonawanda, N.Y., assignors to Hooker Chemical Corporation, Niagara Falls, N.Y., a corporation of New York
No Drawing. Filed Dec. 23, 1960, Ser. No. 77,812
36 Claims. (Cl. 260—461)

This invention relates to an improved method of preparing and recovering trimethyl phosphite and to the preparation of derivatives of trimethyl phosphite.

Numerous processes have been developed for the preparation of trialkyl phosphites such as trimethyl phosphite. In one process phosphorus trichloride is reacted with methanol in the presence of hydrogen chloride acceptors such as ammonia or amines. Numerous problems arise in preparing trimethyl phosphite by this technique. For example, the reaction is highly exothermic, and expensive cooling means must therefore be employed to control the reaction temperature. In addition, the reaction product is a mixture of trimethyl phosphite and a hydrogen chloride salt, which must be treated by expensive purification techniques in order to obtain a relatively pure trimethyl phosphite product. In addition, when amines are used as hydrogen chloride acceptors, the resulting trialkyl phosphite product has an odor due to nitrogen-containing by-products, which is undesirable and difficult to remove.

More recently trialkyl phosphites have been prepared by the transesterification of triaryl phosphites, such as triphenyl phosphite, with an alkyl alcohol in the presence of a basic catalyst. This technique is very effective in preparing tertiary alkyl phosphites from higher alkyl alcohols such as decyl alcohol. Since there is a marked difference in the boiling point of the reaction products tridecyl phosphite and phenol, separation of the phenol from the phosphite is readily attained. However, when this technique is applied to some of the lower alkyl alcohols, such as methanol, the behaviour of the reaction products and reactants in the gaseous state is non-ideal and as a result the separation of trimethyl phosphite from the other reaction products is not easily obtained. Furthermore, when the concentration of free methanol is negligible, relatively large amounts of by-products are formed in the reaction mixture due to isomerization of the trimethyl phosphite product and to the partial or complete back-transesterification of trimethyl phosphite by phenols in the reaction mixture. As a result, a relatively low conversion of phosphorus in the triaryl phosphite to trimethyl phosphite is obtained, and separation of trimethyl phosphite from the reaction mixture is difficult and costly.

That trimethyl phosphite can be generated by a number of different chemical transformations under neutral, basic or acidic conditions is well documented in the prior art. Until the discovery of the present invention one of the major unsolved problems with respect to trimethyl phosphite has been how to provide an economical and readily effective means of recovering trimethyl phosphite from reaction mixtures in high yields and in a high state of purity.

It is an object of the present invention to provide an improved method of preparing and recovering trimethyl phosphite.

A further object of the invention is to provide an improved method of recovering trimethyl phosphite from reaction mixtures in high efficiency with respect to phosphorus values.

A further object of the invention is to provide an improved method of recovering trimethyl phosphite from the reaction products of methanol and either triaryl phosphite, or diaryl methyl phosphite, or aryl dimethyl phosphite, and/or mixtures thereof in the presence of a basic catalyst.

Still another object of the invention is to provide a method of separating a methanol-trimethyl phosphite mixture substantially free of phenols from the reaction mixture produced by transesterifying either triaryl phosphite or diarylmethyl phosphite or aryl dimethyl phosphite and/or mixtures thereof with methanol in the presence of a basic catalyst.

Still another object of the invention is to provide an improved method of separating a methanol-trimethyl phosphite mixture from the reaction mixture of phosphorus trichloride, methanol and hydrogen chloride acceptor in high yield.

Another object of the invention is to provide an improved method of preparing trimethyl phosphate.

It is another object of the invention to provide an improved method of preparing trimethyl phosphorothionate.

A further object of the invention is to provide an improved method of preparing trimethyl phosphoroselenonoate.

Another object of the invention is to provide an improved method of preparing trialkyl and trialkenyl phosphites.

Another object of the invention is to provide an improved method of preparing triallyl phosphite.

Another object of the invention is to provide an improved method of preparing trimethallyl phosphite.

A further object of the invention is to provide an improved method of preparing isomers of trimethyl phosphite.

It is another object of the invention to provide an improved method of preparing trialkyl thiophosphites.

It is a further object of the invention to provide a method of preparing dialkyl hydrogen phosphites of high purity.

Still another object of the invention is to provide an improved method of preparing dialkyl hydrogen phosphites concomitantly with alkyl halides of high purity.

A further object of the invention is to provide an improved process for preparing dimethyl hydrogen phosphite and methyl chloride.

It is another object of the invention to provide an improved process for preparing dimethyl hydrogen phosphite and methyl bromide.

Another object of the invention is to provide an improved process for preparing dimethyl hydrogen phosphite and methyl iodide.

It is a further object of the invention to provide an improved method of preparing dibutyl hydrogen phosphite and butyl chloride.

Still another object of the invention is to provide an improved process for preparing dibutyl hydrogen phosphite and butyl bromide.

Another object of the invention is to provide an improved process for preparing diallyl hydrogen phosphite and allyl chloride.

Still another object of the invention is to provide an improved process for preparing dialkenyl hydrogen phosphites and alkenyl halides.

Another object of the invention is to provide an improved process for preparing dimethallyl hydrogen phosphite and methallyl bromide.

It is a further object of the invention to provide an improved process for preparing diethyl hydrogen phosphite and ethyl chloride.

Another object of the invention is to provide an improved process for preparing diethyl hydrogen phosphite and ethyl bromide.

Another object of the invention is to provide an improved process for preparing diisopropyl hydrogen phosphite and isopropyl chloride.

Still a further object of the invention is to provide an improved process for preparing dicyclohexyl hydrogen phosphite and cyclohexyl bromide.

A further object of the invention is to provide an improved method for preparing trialkyl and trialkenyl phosphates.

Another object of the invention is to provide a process for the preparation of dimethyl methylphosphonate and dimethyl hydrogen phosphite concomitantly.

It is another object of the invention to provide an improved process for preparing trialkyl and trialkenyl phosphorothionates.

Still another object of the invention is to provide an improved process for preparing trialkyl and trialkenyl phosphoroselenonoates.

Also an object of the invention is to provide an improved process for preparing dialkyl alkylphosphonates and dialkenyl alkenylphosphonates.

Still a further object of the invention is to provide an improved process for preparing dialkyl alkenylphosphonates and dialkenyl alkylphosphonates.

Still another object of the invention is to provide an improved process for preparing tetraalkyl alkylene-bis-phosphonates.

A further object of the invention is to provide an improved process for preparing tetraalkyenyl alkylene-bis-phosphonates.

A still further object of the invention is to provide an improved process for preparing organic phosphates having utility as insecticides and/or intermediates for insecticides.

A further object of the invention is to provide an improved process to prepare O,O-dimethyl-O-(2,2-dichlorovinyl)phosphate.

A further object of the invention is to provide an improved process for preparing O,O-dimethyl-O-(2,4,5-trichlorophenyl)phosphorothioate.

A further object of the invention is to provide an improved process for preparing O,O-dimehyl-O-(3-chloro-4-nitrophenyl)phosphorothioate.

A further object of the invention is to provide an improved process for preparing O,O-dimethyl-1-hydroxy-2,2,2-trichloroethyl phosphonate.

A further object of the invention is to provide an improved process for preparing O,O-dimethyl-O-(2-isopropyl-4-methyl pyrimid-6-yl)-thiophosphate.

A still further object of the invention is to provide an improved process for preparing triallyl phosphate.

A still further object of the invention is to provide an improved process for preparing trimethallyl phosphate.

A still further object of the invention is to provide an improved process for preparing O,O-dimethyl(p-nitrophenyl)phosphorothioate.

These and other objects of the invention will be apparent from the following detailed description.

The present invention has been found to be effective in the separation of trimethyl phosphite in substantially quantitative yield and high purity from the reaction mixtures used to prepare trimethyl phosphite, regardless of whether these mixtures are acidic, basic or neutral.

One convenient method for preparing a reaction mixture of trimethyl phosphite is by transesterifying an aryl-substituted phosphite selected from the group consisting of aryl dimethyl phosphites, diaryl methyl phosphites, triaryl phosphites and mixtures thereof, with methanol in the presence of a basic catalyst, distilling the reaction mixture in the presence of sufficient methanol to prevent back-transesterification of the trimethyl phosphite and sufficient methanol to permit codistillation of methanol and all of the trimethyl phosphite from the reaction mixture, while maintaining additional methanol in the distillation residue. The gaseous methanol-trimethyl phosphite mixture produced by the aforesaid distillation technique is substantially free from phenols. Trimethyl phosphite may be readily separated in high purity from this mixture by adding a methanol azeotrope-former to the mixture either prior to or after condensing the mixture, and stripping a mixture of the methanol and methanol azeotrope-former from the trimethyl phosphite. The trimethyl phosphite residue obtained in the azeotropic distillation generally has a purity greater than about ninety-five percent, and the yield, based upon the phosphorus content of the aryl-substituted phosphite, is generally quantitative. The above defined technique for separating trimethyl phosphite from phenols can also be applied to transesterification mixtures that have been generated under either neutral conditions or under conditions of acidic catalysis, but is described in detail hereinafter with respect to the base catalyzed reaction for purposes of illustration. In addition to producing trimethyl phosphite, various derivatives of trimethyl phosphite can be prepared from the mixture of methanol and trimethyl phosphite, the mixture of methanol, methanol-azeotrope-former and trimethyl phosphite, and the substantially pure trimethyl phosphite product, as described more fully hereinafter.

Any triaryl phosphite capable of being transesterified with methanol to yield trimethyl phosphite can be employed. Typical examples of triaryl phosphites include triphenyl phosphite, tricresyl phosphite, tris(2,4-xylenyl) phosphite, tris(butyl phenyl) phosphite, and other tris-(alkylated aryl phosphites, tris(o-chlorophenyl)phosphite, and tris(m-chlorophenyl) phosphite. In addition, unsymmetrical triaryl phosphites can be used such as phenyl dicresyl phosphite, diphenyl cresyl phosphite, phenyl-cresyl-o-chlorophenyl phosphite, dicresyl nonylphenyl phosphite and the like and mixtures thereof.

Any diaryl methyl phosphite capable of being transesterified with methanol to yield trimethyl phosphite can be employed. Typical examples of suitable diaryl methyl phosphites include diphenyl methyl phosphite, phenyl-cresyl methyl phosphite, dicresyl methyl phosphite, di-(butylphenyl) methyl phosphite, di(nonylphenyl) methyl phosphite, di(o-chlorophenyl) methyl phosphite, di(2,4-xylenyl) methyl phosphite and other di(alkylaryl) methyl phosphites, di(chlorophenyl) methyl phosphites, bis-(dichlorophenyl) methyl phosphites, bis(trichlorophenyl) methyl phosphite, cresyl nonylphenyl methyl phosphite, o-chlorophenyl phenyl methyl phosphite and mixtures thereof.

Any aryl dimethyl phosphite capable of being transesterified with methanol to yield trimethyl phosphite can be employed. Typical examples of suitable aryl dimethyl phosphites include phenyl dimethyl phosphite, cresyl dimethyl phosphite, xylenyl dimethyl phosphite, (butylphenyl) dimethyl phosphite, (octylphenyl) dimethyl phosphite, (nonylphenyl) dimethyl phosphite, (chlorophenyl) dimethyl phosphite, (dichlorophenyl) methyl phosphite, (trichlorophenyl) dimethyl phosphite and mixtures thereof.

In addition, mixtures containing triaryl phosphites, diaryl methyl phosphites and aryl dimethyl phosphites can be used.

The catalyst should be a strong enough base to have a pH of greater than seven in an 0.1 normal solution. Typical examples are sodium, potassium, lithium, sodium hydride, potassium hydride, lithium hydride, sodium borohydride, lithium aluminum hydride, sodium sulfide, sodium hydroxide, lithium sulfide, potassium sulfide, sodium methylate, sodium phenolate, potassium phenolate, butyl lithium, phenyl sodium, aluminum isopropoxide, sodium ethylate, potassium ethylate, sodium cetylates, sodium octadecylates, diethyl aniline, quinoline, monododecyl monomethyl amine, pyridine, monododecyl dimethyl amine, etc.

Instead of employing a pre-formed alcoholate, the alcoholate can be formed in situ by adding the metal, e.g., sodium, potassium or lithium to the methanol prior to adding to the aryl-substituted phosphite. If desired, the metal may be added directly to the reaction mixture. The basic catalyst is used in distinctly catalytic amounts, e.g., between about 0.001 and about 0.2 mol, and preferably between about 0.01 and about 0.05 mole per mole of the aryl-substituted phosphite. However, greater or lesser proportions may be employed if desired.

Any compound capable of forming an azeotrope with methanol in the presence of trimethyl phosphite that does not react with the phosphite under the operating conditions described more fully below, may be employed. Suitable azeotrope forming compounds include cyclohexane, benzene, toluene, acetonitrile, ethyl nitrate, acetone, methyl acetate, methyl borate, thiophene, methyl cyclohexane, cyclopentene, cyclopentane, n-pentane, n-octane, methyl cyclopentane, hexanes, octanes, heptenes, 2,2,4-trimethyl pentane, dipropyl ether and any other compound capable of forming an azeotrope with methanol that does not react with trimethyl phosphite under the reaction conditions employed.

At least three basic techniques may be employed to effect the improved results of this invention. These techniques are referred to hereinafter as (1) the batch technique, (2) the recycle technique and (3) the continuous technique. Each technique is capable of numerous modifications of detail without departing from the fundamental concept of the technique.

(1) BATCH TECHNIQUE

In the batch technique methanol and an aryl-substituted phosphite are added to the reaction vessel in a proportion sufficient to provide a stoichiometric excess of methanol necessary to form trimethyl phosphite, for example, at least about one percent stoichiometric excess and preferably between about five and about one hundred percent stoichiometric excess of methanol. A further excess of methanol is added to serve as a codistilling agent for trimethyl phosphite after completion of the reaction, and to provide at least some methanol in the phenol-containing residue after completion of distillation. The proportion of methanol necessary to serve as a codistilling agent will vary with the type of product desired. For example, when the weight ratio of methanol to trimethyl phosphite (not accounting for the proportion of methanol to form trimethyl phosphite), is about ten to one, the concentration of trimethyl phosphite in the methanol-trimethyl phosphite distillate is relatively low. If a high concentration of trimethyl phosphite is desired, without regard to degree of conversion, a relatively low weight ratio of methanol to trimethyl phosphite may be employed.

The basic catalyst is added in the above-defined proportions to the methanol and aryl-substituted phosphite, and the reactants are then heated to a temperature preferably between about eighty and about one hundred and fifty degrees centigrade. Temperatures below eighty degrees centigrade may be employed; for example, the reaction may be carried out at room temperature or lower. Temperatures above about one hundred and fifty degrees centigrade may be employed, but at these higher temperatures there is danger of thermally induced by-product reactions occurring, particularly when extended reaction periods are employed. The reaction may be carried out at any convenient pressure, for example, at subatmospheric pressure, at atmospheric pressure, or at superatmospheric pressure. The reaction and separation periods will depend upon the temperature and pressure conditions employed, as well as the proportion of excess methanol and the concentration of catalyst in the reaction mixture. The reaction mixture is distilled while simultaneously adding to the distillation pot sufficient methanol to prevent back-transesterification of the trimethyl phosphite, and the methanol addition is continued until substantially all of the trimethyl phosphite is distilled from the reaction mixture. The resulting distillate, which is a mixture of methanol and trimethyl phosphite may be condensed and collected for further processing, as described more fully below. For example, this mixture may be admixed with an azeotropeformer and subjected to distillation to yield a vapor phase containing methanol and the azeotrope-former, and a liquid phase of substantially pure trimethyl phosphite.

(2) RECYCLE TECHNIQUE

In the recycle technique an aryl-substituted phosphite and methanol are added to a reaction vessel provided with a distillation column and a heating means for the reaction vessel. Means are provided for conveying the gases from the top of the distillation column to a condenser and the resulting condensate is conveyed by suitable piping means to the product vessel. The product vessel is also provided with a distillation column and heating means, suitable piping means being provided for conveying the gases from the top of the distillation column of the produce vessel to a condenser and then back to the reaction flask.

A number of ways exist in which a recycle system such as the one described here can be started and operated. For example, it is possible to charge the aryl-substituted phosphite, the catalyst and methanol to the reaction vessel, and a mixture of methanol and azeotropeformer to the product vessel individually. It is possible to charge the aryl-substituted phosphite and the catalyst to the reaction vessel together or charge the methanol and catalyst into the reaction vessel together. In addition it is possible to charge the aryl-substituted phosphite and catalyst to the reaction vessel and charge all the methanol, i.e., that needed for reaction as well as that needed with the azeotrope-former for codistillation, into the product vessel with the azetrope-former and then charge the reaction vessel with the methanol by distilling the azeotrope from the product vessel to the reaction vessel. In addition, it makes little difference in the separation efficiency of the methanol as to whether it is added below the surface of the contents of the reaction vessel or to the surface of the contents of the reaction vessel when it is added as a liquid. As a means of more efficient heating of the reaction vessel, the methanol can be vaporized and introduced under the surface of the contents of the reaction vessel as a gas and under such circumstances, there is a profound difference in this operation from the introduction of methanol vapors into the vapor space of the reaction vessel.

The azeotrope former is needed primarily to prevent the codistillation of trimethyl phosphite with methanol from the product vessel to the reaction vessel. As a result, it is possible then to run the condensate from the distillation column above the product vessel through a liquid separator, then split the methanol-rich layer and the azeotrope-former-rich-layer, and feed the methanol-rich layer to the reaction vessel while the azeotropeformer-rich layer is returned to the product vessel. This mode of operation reduces the heat load upon the reaction vessel as contrasted to operation where the total condensate off the condenser on the column of the product vessel is recycled to the reaction vessel. Other modifications of details are possible and are contemplated and the disclosures are helpful in definition only and not limiting to the specific mode of operation as described below.

At start up, when a triaryl phosphite, methanol and the basic catalyst are charged to the reaction vessel, the proportion of methanol is equivalent to about three moles per mole of triaryl phosphite, and the basic catalyst is added in a proportion between about 0.001 and 0.2 mole per mole of the triaryl phosphite under normal operations. Additional methanol and an azetrope-former and a small proportion of the basic catalyst are added to the product vessel. The proportion of methanol added to the product vessel is sufficient to permit the azeotrope-former to be distilled through the column on the product vessel with a minimal amount of trimethyl phosphite present. The actual quantity is dependent upon such factors as the specific azeotrope-former used, the efficiency of the fractionating column on the product vessel and whether the trimethyl phosphite is to be isolated as a pure chemical entity or is to be reacted in the product vessel with another chemical in solution with the methanol and azetrope-former. For example, if trimethyl phosphite is to be converted to trimethyl phosphorothionate, sulfur can be added to the product vessel and the azeotrope-former can be eliminated entirely.

The reactants in the reaction vessel are heated to incipient boiling up to a maximum of about one hundred and fifty degrees centigrade at which time the transesterification reaction is sufficiently complete to permit the co-distillation process to begin. At this time the separation phase of the process involving the co-distillation of methanol-trimethyl phosphite and the azetrope-former from the reaction vessel is begun by distilling the methanol and azetrope-former from the product vessel up the column to the condenser and then returning the condensate to the reaction vessel where the methanol co-distills with the trimethyl phosphite, and the azetrope-former is essentially flash distilled along with the methanol-trimethyl phosphite. This gaseous stream of methanol, trimethyl phosphite and azetrope-former from the top of the distillation column of the reaction vessel is condensed and conveyed to the product vessel. The contents of the product vessel are maintained at a boiling temperature, which generally is between about fifty-eight and about eighty degrees centigrade at atmospheric pressure when cyclohexane is used as the azetrope-former. The boiling temperature of the product vessel contents or body is dependent upon the concentration of methanol, trimethyl phosphite and azetrope-former present in the vessel. This temperature changes during the course of the separation phase as more trimethyl phosphite accumulates in the product vessel as the separation process progresses. The azeotrope of methanol and the azetrope-former, e.g., cyclohexane, is recycled to the reaction vessel to repeat the cycle and this is continued until substantially all of the available trimethyl phosphite is removed from the reaction vessel to the product vessel. The contents remaining in the reaction vessel are then stripped of dissolved methanol, azetrope-former and phenolic substance. The remainder is left in the reaction vessel and a second charge is added to this material. This residue may contain from about ten percent up to about twenty percent of the phosphorus originally charged.

The material in the product vessel is then further distilled to remove the methanol and the azetrope-former and it may be necessary to add additional quantities of methanol or the azetrope-former in order to remove these materials efficiently and leave the trimethyl phosphite as a residue product having assay values in the range of about ninety-two to about ninety-eight percent trimethyl phosphite. In addition, the trimethyl phosphite can be distilled and, contingent upon the purity required, trimethyl phosphite having assay values of about ninety-five to about ninety-nine percent can be readily attained.

The methanol and the azetrope-former recovered from the product vessel are returned to the product vessel for the next run. The procedure is then repeated by adding additional triaryl phosphite, methanol and catalyst to the reaction vessel and make-up methanol and azetrope-former to the product vessel. Dependent upon size of vessels, and other operating conditions, it is possible to make several charges to the reaction vessel while holding the trimethyl phosphite from several runs in the product vessel before making a final concentration or distillation. When vessel sizes are adequate, triaryl phosphite can be added to the reaction vessel as a top charge while the separation of the trimethyl phosphite is in progress from an earlier charge thus permitting concomitant transesterification and separation in the recycle technique. Although the description of the recycle technique has dealt with operation under essentially atmospheric conditions, the operation can be conducted under either superatmospheric or subatmospheric pressure as well, and this would change some of the temperature relationships but not the basic concept of the invention.

The trimethyl phosphite produced in accordance with this technique can be processed with other chemicals as a methanol-azetrope-former solution, as a concentrated residue product or as a purified distilled product as defined more fully below.

When more methanol is present in the product vessel than can be removed with the azetrope-former, then a concentrated trimethyl phosphite solution in methanol is obtained as a residue product, and this is desirable for some future chemical processing steps.

On the other hand, when more than enough azetrope-former is present to remove the methanol then a concentrated trimethyl phosphite solution in the azetrope-former is obtained as a residue product and this is desirable as a reactant stream of trimethyl phosphite where the presence of free methanol is undesirable.

(3) CONTINUOUS TECHNIQUE

There are numerous variations that can be employed to permit the continuous transesterification of aryl-substituted phosphites, (triaryl phosphites, diaryl methyl phosphites, aryl dimethyl phosphites and mixtures thereof) with methanol and the continuous co-distillation of a methanol-trimethyl phosphite mixture. These variations embody the basic concepts of the instant invention which is described in respect to a specific type of continuous technique for illustrative purposes and not for purposes of limitation.

An apparatus employed in one of the embodiments of the continuous technique is comprised of the following. A transesterification vessel equipped with suitable means for charging the aryl-substituted phosphite, methanol and basic catalyst either individually or in admixture. This vessel also is equipped with suitable heating means, agitation means, and piping for the continuous outflow of the transesterified mixture to a co-distillation vessel. The co-distillation vessel is equipped with suitable heating means, piping means for a continuous outflow of non-volatiles, a fractionation column equipped with a condenser and a fraction splitter to permit partial flow of the condensate to the top of the column as a reflux and the remainder to flow via suitable piping means to the collection vessel for the condensed volatiles from the co-distillation vessel.

The aforementioned apparatus is a basic skeletal equipment required for an embodiment of the instant invention which will be described as to operating conditions hereinafter.

The aryl-substituted phosphite, methanol and the basic catalyst are fed to the transesterification vessel maintained at about eighty degrees centigrade to about one hundred and fifty degrees centigrade under atmospheric conditions. The proportion of methanol in the feed is equivalent to that proportion necessary to transesterify the aryl-substituted phosphite to trimethyl phosphite and an additional amount of methanol to give a weight ratio of methanol to trimethyl phosphite of from about 0.2 to one to about eighty to one. In order to obtain greater than about ninety-five percent recovery of trimethyl phosphite, the preferred weight ratios of methanol to trimethyl phosphite are between about two to one and about fifty to one, contingent upon the temperature in the co-distillation vessel. The residence time in the transesterification vessel is long enough to permit sufficient transesterification to occur prior to feeding the mixture to the co-distillation vessel and is generally from about five minutes to one hundred and twenty minutes at temperatures of about one hundred and fifty degrees centigrade and of about room temperature, respectively.

The transesterified mixture is then fed continuously to the co-distillation vessel maintained at a temperature in the range between about eighty degrees centigrade to about one hundred and fifty degrees centigrade. Temperatures below eighty degrees centigrade can be used under about atmospheric pressure, but are less efficient in the utilization of the methanol as a co-distillation agent and are less efficient in obtaining optimum productive capacity per unit volume of the co-distillation vessel. Temperatures above about one hundred and fifty degrees are particularly conducive to undesired chemical side-reactions.

When the transesterified mixture enters the co-distillation vessel either as an above the surface feed or an under the surface feed, a mixture of methanol and trimethyl phosphite is vaporized and passes up the fractionation column to the condenser where it is condensed. A portion of the condensate is passed from a fraction splitter to the top of the fractionation column to serve as a reflux to sequester the carry-over of phenolic substances to the condensate stream. The other condensate stream from the fraction splitter is conducted via suitable piping means to the collection vessel.

The condensate in the collection vessel which is a solution of trimethyl phosphite in methanol can be reacted continuously with such chemical reagents as sulfur to form trimethyl phosphorothionate while continuously stripping methanol and returning it to the methanol feed stream of the transesterification vessel.

Under the conditions when a concentrated trimethyl phosphite is desired, the condensate from the collection vessel is diluted with a suitable methanol azeotrope-former, e.g., cyclohexane or methylcyclohexane. This diluted stream is then fed to a continuous fractionation column wherein the methanol azeotrope passes overhead and is condensed. The condensate is separated into a methanol-rich layer and a methanol-azeotrope-former-rich layer. The respective methanol-rich and methanol-azeotrope-former-rich layers are recycled to the appropriate streams. The concentrated trimethyl phosphite passes down the column and is collected as a bottoms product for use in future chemical reactions. When the methanol azeotrope-former is added in just the right proportion to azeotrope out all of the methanol, a trimethyl phosphite bottoms product is obtained that assays from ninety-two to ninety-eight percent pure. When a concentrated trimethyl phosphite stream with methanol as an impurity is desired, then an inadequate amount of the methanol azeotrope-former is added to the condensate from the collection vessel. If, on the other hand, a trimethyl phosphite is desired with the methanol azeotrope-former as the impurity, then an excess of the methanol azeotrope-former is added to the condensate from the collection vessel. For example, when the continuous process is operating to yield a stream of condensate into the collection vessel having a weight ratio of about eight parts of trimethyl phosphite to about eighty-two parts of methanol, then dilution with about one hundred and thirty-four parts of cyclohexane is required as an azeotrope-former to obtain a trimethyl phosphite essentially free of both methanol and methanol azeotrope-former. If a trimethyl phosphite with essentially ten percent methanol as an impurity is desired, then one hundred and thirty parts of cyclohexane as an azeotrope-former is added per one hundred parts of condensate stream. On the other hand, when a ten percent cyclohexane impurity is desired in the trimethyl phosphite then one hundred and thirty-six parts of cyclohexane is added per one hundred parts of condensate stream.

Under similar conditions, except that methyl cyclohexane is used as the azeotrope-former rather than cyclohexane, then seventy parts, sixty-eight parts, and seventy-two parts of methylcyclohexane are added per one hundred parts of condensate stream to produce products essentially free of methanol and methylcylohexane, with ten percent methanol impurity and with ten percent methylcyclohexane impurity respectively. The concentrated streams of trimethyl phosphite are subjected to batch fractionation to obtain distilled trimethyl phosphite or are fed to suitable continuous fractionation columns to obtain distilled trimethyl phosphite. Distilled trimethyl phosphite produced via the continuous co-distillation separation technique, followed by removal of methanol by azeotropic distillation with a methanol azeotrope-former and a subsequent batch fractionation yields trimethyl phosphite as a distilled product that essays ninety-five to ninety-nine percent pure.

The liquid outflow from the co-distillation vessel is conducted to a continuous fractionation column held under reduced pressure. The column separates all volatiles up to the boiling point of the phenol present, and once separated, they are recycled to the transesterification vessel. The remaining non-volatiles are passed to a second continuous distillation apparatus, wherein the phenols are recovered and returned to the aryl-substituted phosphite plant. The residue from this distillation is recycled to the transesterification vessel except for a small effluent stream that is removed to prevent the build up of salts and by-products.

This embodiment can be modified wherein the co-distillation vessel may function both as a transesterification vessel and the co-distillation vessel. In addition, the point at which the transesterification mixture enters can vary, as for example at some point in the fractionation column, at the top of the co-distillation vessel, or in fact under the liquid surface of the co-distillation vessel or even through the bottom of the co-distillation vessel. Furthermore, the means used to remove the outflow from the co-distillation vessel is not critical but must be consistent with sound engineering practice and economical operation of the plant.

In some instances, some of the recycle streams both of the condensate and the outflow from the co-distillation vessel may be filtered or treated in other ways to remove undesirable impurities or to recover economic values from by-products.

The transesterification and the co-distillation steps of the continuous technique can be carried out readily under conditions of subatmospheric or superatmospheric pressure as well as atmospheric.

In accordance with the instant invention including the above described batch technique, recycle technique, and continuous technique, methanol functions not only as a reactant to transesterify the aryl-substituted phosphite but also as a co-distilling agent for the efficient removal of the trimethyl phosphite from the transesterified mixture. Therefore, sufficient methanol should be present during distillation to serve both purposes.

During the course of the transesterification reaction and the co-distillation separation, it is necessary to provide methanol as a reactant equal in moles to the moles of the aryl substituents in the aryl-substituted phosphite in order to obtain maximum yields of trimethyl phosphite.

In instances where the aryl-substituted phosphite contains only one aryl substituent, co-distillation of methanol and trimethyl phosphite can actually begin before one mole of methanol has reacted with the aryl-substituted phosphite. However, in order to obtain the high yields ultimately during the transesterification and co-distillation one mole of methanol must react with the aryl-substituted phosphite. Similar results are obtained in cases where the aryl-substituted phosphites contain two and three aryl substituents.

With sufficient phosphorus present as trimethyl phosphite after the reaction it is necessary to retain it in this form until the trimethyl phosphite is separated from the phenols present. This can be accomplished by maintaining an excess of methanol in the transesterified mixture while co-distilling a mixture of methanol and trimethyl phosphite therefrom. When distilling under atmospheric pressure the concentration of free methanol in the transesterified mixture will be controlled by the temperature at which the co-distillation process is conducted and the type of aryl phosphite used as starting material. At a given temperature the mole percent excess of methanol relative to the phosphorus content in the transesterified mixture will change as the mole fraction of trimethyl phosphite in the mixture diminishes as it co-distills out with methanol. Some methanol will dissolve in the transesterification mixture to contribute a greater partial vapor pressure to compensate for the loss in partial vapor pressure previously contributed by the trimethyl phosphite.

The proportion of methanol that is used as a co-distilling agent to promote the effective separation of the trimethyl phosphite from the phenols (in order to permit the isolation of highly purified trimethyl phosphite without the attendant problems of back-transesterification when phenols are present), must be sufficient to remove the trimethyl phosphite under the distillation conditions employed. However, the excess should not be so great that subsequent separation of trimethyl phosphite from the methanol solution is an economic liability.

The weight ratio of methanol to trimethyl phosphite necessary to effect substantially complete separation of the available trimethyl phosphite from the transesterification mixture will vary with the temperature, pressure, and the type of aryl-substituted phosphite. When triphenyl phosphite is employed as the aryl-substituted phosphite, and distillation is effected at atmospheric pressure and a temperature between about seventy-five and about eighty degrees centigrade, an average weight ratio of methanol to trimethyl phosphite of about twelve to one is required during co-distillation to recover about ninety-five percent of the trimethyl phosphite. During the initial phases of the separation process, in the batch and recycle techniques, the weight ratio of methanol to trimethyl phosphite in the co-distillate may be as low as about five to one and when the trimethyl phosphite in the transesterified mixture is nearly depleted, the weight ratio may be as high as about sixty-five to one, with an average ratio during the separation step of about twelve to one. When phenyldimethyl phosphite is employed as the aryl-substituted phosphite under the same co-distillation conditions, the average methanol to trimethyl phosphite ratio required is about 8.2 to one, and may range from between about two to one to about fifty-five to one as co-distillation progresses in the batch and recycle techniques. The corresponding weight ratios necessary when diphenylmethyl phosphite is employed are intermediate of those necessary for triphenyl phosphite and phenyldimethyl phosphite.

When triphenyl phosphite is employed, and co-distillation is effected at a temperature between about ninety and about one hundred degrees centigrade, an average weight ratio of methanol to trimethyl phosphite of about 6.5 to one is necessary to separate about ninety-five percent of the trimethyl phosphite. When phenyldimethyl phosphite is employed at these temperature conditions, the average weight ratio is about 4.5 to one. When distillation is effected under similar conditions at a temperature between about one hundred and twenty-five and about one hundred and thirty-five degrees centigrade, the average weight ratio of methanol to trimethyl phosphite necessary to separate about ninety-five percent of the trimethyl phosphite is 3.5 to one when triphenyl phosphite is employed and about 2.4 to one when phenyldimethyl phosphite is employed.

Under atmospheric conditions the separation of trimethyl phosphite from the transesterified mixture can be effected at temperatures from about sixty-five degrees centigrade to about one hundred and fifty degrees centigrade using a methanol to trimethyl phosphite average weight ratio from about twenty-five to one down to as low as about one to one. Instant methanol to trimethyl phosphite weight ratios can vary from about one hundred to one to about 0.3 to one.

The actual practical mode of operation depends to a large extent upon the ultimate use that the trimethyl phosphite is to be put and the ultimate need for quality products from reacting trimethyl phosphite alone or in solution with other chemical reagents.

Under continuous operation with the use of a number of co-distillation stages a methanol-trimethyl phosphite stream of about thirty percent trimethyl phosphite is obtained that can then be separated by practical commercial fractionation columns. This type of operation requires the recycling of a stream of about ten percent trimethyl phosphite in methanol.

In addition, such separation techniques as liquid thermal diffusion, gaseous thermal diffusion, liquid-liquid extraction, selective adsorption can be used to effect separation of trimethyl phosphite. It is recognized that these separation techniques are applicable to the batch, recycle and continuous techniques with proper modifications to fit their operating procedures.

The substantially pure trimethyl phosphite product, the distilled trimethyl phosphite product, the mixture of trimethyl phosphite and methanol, the mixture of trimethyl phosphite, methanol and methanol azeotrope-former, the mixture of the trimethyl phosphite and the methanol azeotrope-former and mixtures thereof may be further processed to yield derivatives of trimethyl phosphite. For example, the trimethyl phosphite may be reacted with sulfur to yield trimethyl phosphorothionate; with selenium to yield trimethyl phosphoroselenonoate; with methyl bromide, methyl iodide, etc., to yield concomitantly dimethyl methylphosphonate and dimethyl hydrogen phosphite; with hydrogen chloride, hydrogen bromide and hydrogen iodide to yield dimethyl hydrogen phosphite and a relatively pure stream of the corresponding methyl halide; with alkyl and alkenyl alcohols under basic catalysis with a methanol azeotrope-former to yield monomethyl dialkyl phosphites, dimethyl alkyl phosphites, trialkyl phosphites, monomethyl dialkenyl phosphites, dimethyl alkenyl phosphites, and trialkenyl phosphites; with oxygen and oxygen-containing gas mixtures and catalysts to yield trimethyl phosphate; with alkylene oxides to yield trimethyl phosphate; with nitrogen oxides to yield trimethyl phosphate; with peroxides to yield trimethyl phosphate; with chloral to yield dimethyl dichlorovinyl phosphate; with alkylene dibromide to yield the corresponding tetramethyl alkylene bis-phosphonates as well as other reactions derived from the products developed. These and other reactions are discussed in more detail below.

(1) REACTION WITH SULFUR

The mixture of trimethyl phosphite and methanol produced in the batch technique may be reacted with the sulfur to yield trimethyl phosphorothionate. This reaction may be effected by any one of several techniques. The physical state of the sulfur is not critical except that it should be relatively easily dispersed in the mixture by conventional agitation means. For example, finely divided sulfur, having a particle size preferably all of which passes through a two hundred mesh screen, is admixed with the liquid condensate comprising a mixture of trimethyl phosphite and methanol, in a proportion sufficient to provide a molar excess of sulfur to the trimethyl phosphite. The reaction is exothermic and no external heat source need be provided to effect reaction. Substantially all of the methanol can be vaporized from the reaction mixture under reduced pressure, and may be condensed and collected for use in preparing additional trimethyl phosphite. The residue, which may contain unreacted sulfur, may be subjected to any conventional solid-liquid separation technique such as filtration, centrifugation and the like, to remove unreacted sulfur, and substantially pure trimethyl phosphorothionate is collected as the liquid residue. If desired, the reaction of the liquid trimethyl phosphite-methanol product of the batch technique and sulfur may be effected in a column packed with sulfur.

When it is desired to prepare trimethyl phosphorothionate from trimethyl phosphite in accordance with the recycle technique, the recycle technique is modified to eliminate the azeotrope-former, and instead dispersable sulfur is added to the product vessel. A gaseous mixture of trimethyl phosphite and methanol is then conveyed from the reaction vessel distillation column through the condenser to the product vessel as a condensate where the trimethyl phosphite component of the mixture reacts with sulfur to yield trimethyl phosphorothionate. This chemical reaction is effected over the temperature range between about sixty-five degrees centigrade to about one hundred degrees centigrade at atmospheric pressure, although higher temperatures may be employed if desired. Reaction occurs readily at lower temperatures but cannot be used in the recycle technique under atmospheric pressure because the methanol cannot be distilled from the product vessel at temperatures below sixty-five degrees centigrade without an azeotrope-former. The methanol is vaporized and conveyed from the product vessel distillation column to the reaction vessel. The residue from the product vessel, which contains trimethyl phosphorothionate, unreacted sulfur, and methanol may then be stripped to remove methanol, and then subjected to a suitable solid-liquid separation technique to separate unreacted sulfur from the substantially pure trimethyl phosphorothionate.

When the continuous technique is employed to prepare trimethyl phosphite, sulfur is reacted with either the gaseous mixture of trimethyl phosphite and methanol or the liquid condensate comprising the mixture of trimethyl phosphite and methanol to yield trimethyl phosphorothionate, as described above in connection with the reaction of sulfur with the trimethyl phosphite-containing product produced in the batch process.

It is also possible to effect the reaction with sulfur in a similar manner when a reaction stream is used that is a mixture of trimethyl phosphite and a methanol-azeotrope-former, or a stream of concentrated trimethyl phosphite that is essentially free of both methanol and a methanol-azeotrope-former. The presence of both methanol and a methanol-azeotrope-former is not deleterious to the chemical reaction taking place.

The other phosphites produced via the transesterification reaction of trimethyl phosphite with alkyl and alkenyl alcohols as well as phenols can be reacted in a similar manner with sulfur to produce phosphorothionates and the extent of the reaction can best be illustrated by the following representative equations.

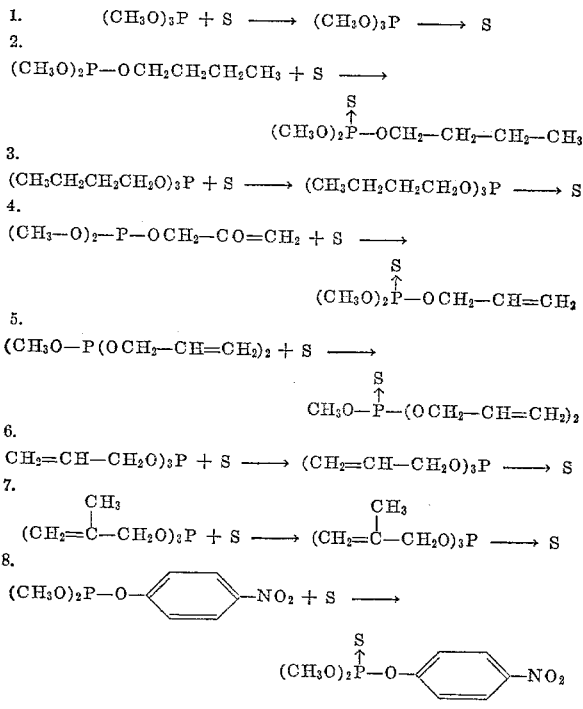

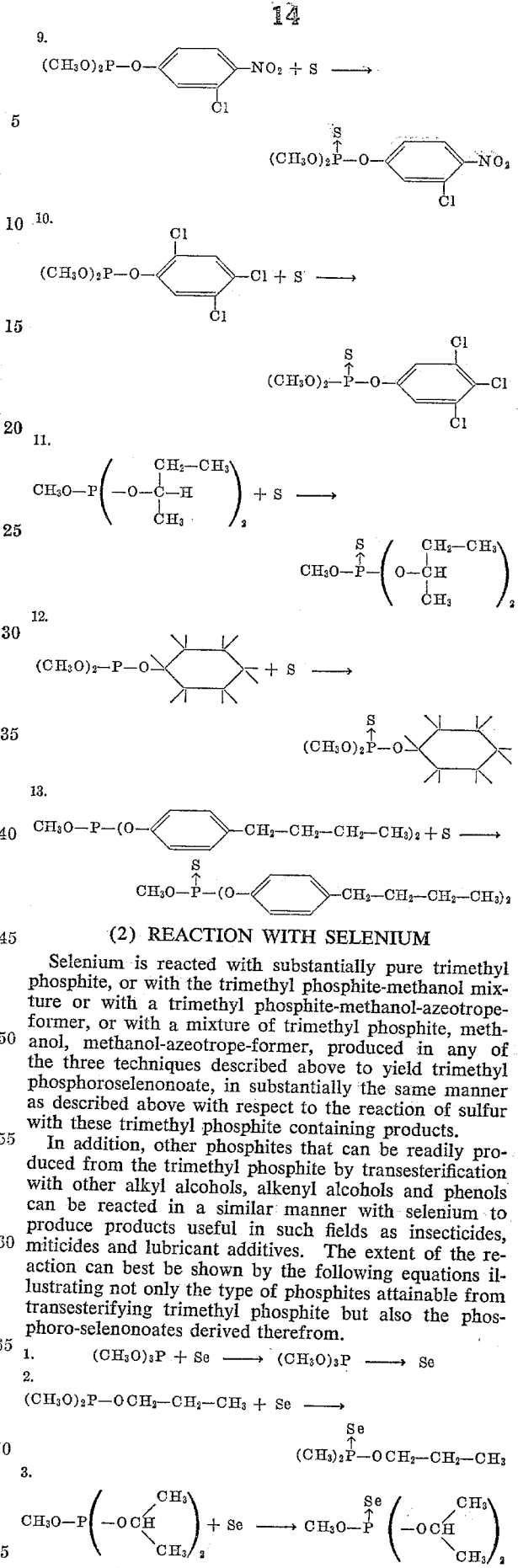

(2) REACTION WITH SELENIUM

Selenium is reacted with substantially pure trimethyl phosphite, or with the trimethyl phosphite-methanol mixture or with a trimethyl phosphite-methanol-azeotrope-former, or with a mixture of trimethyl phosphite, methanol, methanol-azeotrope-former, produced in any of the three techniques described above to yield trimethyl phosphoroselenonoate, in substantially the same manner as described above with respect to the reaction of sulfur with these trimethyl phosphite containing products.

In addition, other phosphites that can be readily produced from the trimethyl phosphite by transesterification with other alkyl alcohols, alkenyl alcohols and phenols can be reacted in a similar manner with selenium to produce products useful in such fields as insecticides, miticides and lubricant additives. The extent of the reaction can best be shown by the following equations illustrating not only the type of phosphites attainable from transesterifying trimethyl phosphite but also the phosphoro-selenonoates derived therefrom.

4.

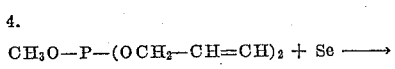

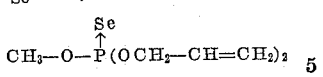

5.

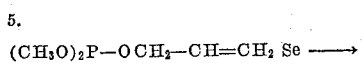

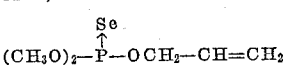

6.

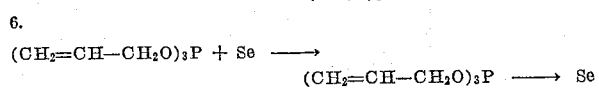

7.

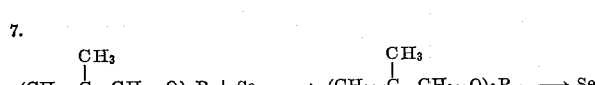

8.

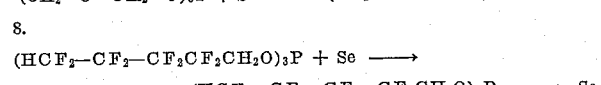

9.

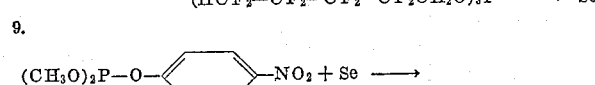

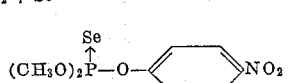

10.

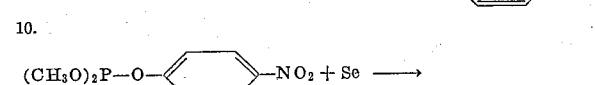

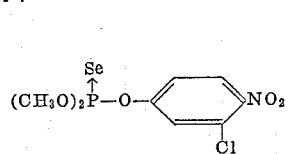

11.

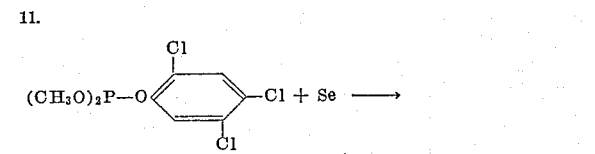

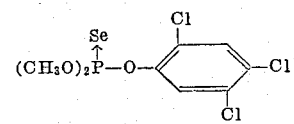

12.

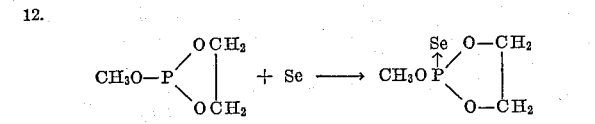

13.

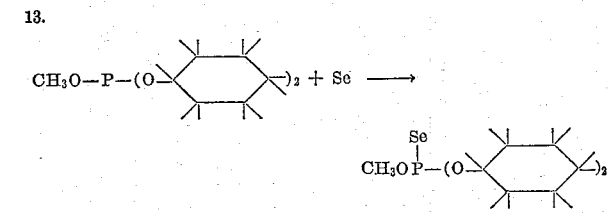

14.

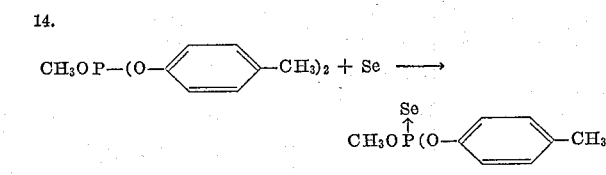

15.

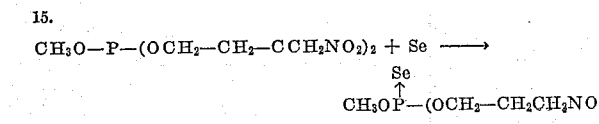

(3) REACTION WITH OXYGEN-CONTAINING COMPOUNDS

Oxidation of the trimethyl phosphite to the corresponding phosphate may be effected by admixing purified trimethyl phosphite, concentrated trimethyl phosphite, a mixture of trimethyl phosphite and methanol, a mixture of trimethyl phosphite and the azeotrope-former, a mixture of trimethyl phosphite, methanol and the methanol azeotrope-former and mixtures thereof produced by the batch, recycle, or continuous technique, with an oxygen-containing gas in the presence of a metal oxide catalyst. Suitable oxygen-containing gases include oxygen, air and mixtures thereof. Suitable metal oxide catalysts include aluminum oxide, vanadium pentoxide and mixtures thereof. Sufficient metal oxide is added to the phosphite to provide at least about 0.25 percent, and preferably between about two and about ten percent by weight of the phosphite. However, greater or lesser amounts of metal oxide catalyst may be added if desired. Sufficient oxygen-containing gas is reacted with the trimethyl phosphite in proportions to convert substantially all of phosphite to the corresponding phosphate. Completion of the reaction can be determined by any suitable means. The rate of addition of the oxygen-containing gas will vary with the oxygen content of the gas. For example, larger quantities of air are necessary to effect the same degree of reaction than when oxygen is employed as the gas. Any rate of addition of oxygen-containing gas that is consistent with economic operation may be employed. The oxygen-containing gas may be reacted with the trimethyl phosphite by bubbling the gas through the phosphite by means of a sparging system or any other suitable liquid-gas contacting technique. The oxygen-containing gas may also react with the trimethyl phosphite in the vapor state in a suitable catalyst chamber.

The temperature of the reaction in the liquid phase should be maintained between about eighty and about one hundred and eighty degrees centigrade, under atmospheric pressure. Higher temperatures up to about two hundred and twenty degrees centigrade can be used when the oxidation is conducted at superatmosphere pressure. When temperatures above about one hundred and eighty degrees centigrade are attained in the reaction mixture, isomerization of trimethyl phosphite to phosphonate may occur, and the reaction may be difficult to control. Temperatures below about eighty degrees centigrade may be employed, but at these temperatures, the reaction rate is reduced.

Since the reaction mixture is substantially free of water, the danger of hydrolysis of the phosphite is lessened.

The time of reaction will depend upon the rate of addition of the oxygen-containing gas. Generally, complete conversion of the phosphite to the phosphate can be attained in as little as about eight hours, but when no catalyst is used the reaction may take more than thirty hours.

The trimethyl phosphite can also be converted to trimethyl phosphate by reaction with other oxidizing agents such as peroxides, hydroperoxides, nitrogen oxides, etc.

In addition, other tertiary phosphites prepared via the transesterification of trimethyl phosphite can also be subjected to the discussed oxidation techniques to yield the phosphates corresponding to the starting phosphites, where preparation from trimethyl phosphite is disclosed below.

(4) ISOMERIZATION

Concentrated trimethyl phosphite, purified trimethyl phosphite, a mixture of trimethyl phosphite and methanol, a mixture of trimethyl phosphite and methanol-azeotrope-former, a mixture of trimethyl phosphite, methanol and methanol-azeotrope-former, as well as mixtures thereof, derived from the transesterification of aryl-substituted phosphites by the batch, recycle or continuous technique can be caused to undergo isomerization in the presence of methyl bromide, methyl iodide, sodium iodide, potassium iodide, potassium bromide, etc., to yield dimethyl methylphosphonate. In instances where the source of trimethyl phosphite contains methanol the isomerization reaction occurs with a side reaction that yields as a coproduct dimethyl hydrogen phosphite as well as the dimethyl methylphosphonate. The separation of the two phosphorus containing products can be effected by conventional means such as fractional distillation. In addition, the dimethyl hydrogen phosphite can be caused to react with other chemical intermediates, as for example, with chloral to form O,O-dimethyl-1-hydroxy-2,2,2-trichloro ethylphosphonate and under such circumstances the dimethyl methylphosphonate functions as a solvent medium and is separated from the final product of the dimethyl hydrogen phosphite by distillation or crystallization techniques.

In instances where substantially pure trimethyl phosphite of greater than about ninety-five percent purity is available from the batch, recycle, or continuous techniques, the isomerization reaction with methyl bromide, methyl iodide, sodium iodide, potassium iodide, etc., is effected readily even when the catalyst concentration is as low as about 0.1 mole percent based on the trimethyl phosphite. Concentrations of catalyst considerably below 0.1 percent can be used with reduced reaction rates.

The isomerization reaction proceeds at room temperature except that the rate is relatively slow, and times of upwards of forty-eight hours are required to effect isomerization under these conditions. On the other hand, if the reactants are added to a heel of dimethyl methylphosphonate held at about one hundred and fifty degrees centigrade, the isomerization is complete in a matter of a few minutes. Stripping the reaction mixture of the catalysts and minor volatile impurities originally present in the trimethyl phosphite yields a dimethyl methylphosphonate product of good color and high purity. In addition, if further purification of the dimethyl methylphosphonate is required this can be effected conveniently by a number of conventional distillation or fractionation techniques.

As is readily apparent from the examples the isomerization is conducted either as a batch, semi-continuous or a continuous operation and proceeds under either atmospheric or subatmospheric or superatmospheric conditions.

The trimethyl phosphite produced via the techniques of the instant invention is useful as a raw material source for the preparation of mixed phosphonates, bisphosphonates, and polyphosphonates. These types of phosphonates can be produced readily by admixing molar and greater than molar amounts of an organic halide other than the methyls and subjecting the mixture to reaction conditions heretofore described. Under these circumstances, methyl halide is liberated and a carbon-phosphorus bond is established between the admixed organic halide and the phosphorus atom of the trimethyl phosphite.

In instances where bis- or polyphosphonates are desired as the end products then the di- or polyhalide is admixed with about molar quantities of trimethyl phosphite equivalent to the halide atoms to be replaced and is subjected to the heretofore described conditions except that temperatures up to about two hundred degrees centigrade may be employed. Methyl halide is liberated in proportion to the number of carbon-phosphorus bonds formed.

Typical of the types of organic halides that can be used to produce mixed phosphonates, bisphosphonates and polyphosphonates are allyl chloride, allyl bromide, allyl iodide, methallyl chloride, methallyl bromide, methallyl iodide, 3-bromocyclohexene, 3-bromocyclopentene, chlorocyclohexane, ethylene dibromide, 1,3-dibromopropane, 1,4-dibromobutane, 1,5-dibromopentane 1,6 - dibromohexane, 1,6-dichlorohexane, 1,2-bis(chloromethyl) benzene, 1,3-bis(chloromethyl) benzene, 1,4-bis(chloromethyl) benzene, 1,3,5-tris(chloromethyl) benzene, butyl iodide, octyl bromide, ethyl p-toluene sulfonate, ethyl bromoacetate, β-bromoethyl ethyl ether, epibromohydrin, epichlorohydrin, cyanuric chloride, 3-chloromethyl isoxazole, 2,3-bis(bromomethyl)quinoxaline, 4-methylbenzyl bromide, 2,4-dimethyl benzyl chloride, 5,8-bis (chloromethyl)-1,2,3,4-tetrahydronaphthalene, propargyl bromide, β-bromoethyl acetate, tetrahydrofurfuryl bromide, diiodomethane, bis(bromomethyl) ether, 1,3-dichloropropane, carbon tetrachloride, bromo acetone, chloroacetone, 2-chlorocyclopentanone, 2-chlorocyclohexanone, 2-chloro-3-methylcyclohexanone, propionyl chloride, chloroacetonitrile, α-chloro-N,N-diethylacetamide, trichloroacetyl chloride.

(5) REACTION WITH ALCOHOLS

Trimethyl phosphite available in the different states of purity and/or dilutions from the batch, recycle, and continuous techniques of the instant invention is particularly useful in the preparation of other tertiary phosphites by transesterification under basic catalysis. Other tertiary phosphites prepared from trimethyl phosphite are those that can arise from the reaction of trimethyl phosphite with an organic hydroxy compound having a COH group, wherein the three remaining valances of the carbon atom are satisfied by substituents selected from the group consisting of hydrogen, carbon, and mixtures thereof, such as alkyl, substituted-alkyl, cyclic, substituted-cyclic, dihydric, polyhydric, alkenyl and substituted-alkenyl alcohols as well as those arising from its reaction with phenols and substituted phenols.

Although the source of trimethyl phosphite can arise from the batch, recycle or continuous techniques without any deleterious effects upon the chemical transformations, surprisingly it has been found that while operating the recycle technique to produce trimethyl phosphite, it is possible to prepare the other phosphites simultaneously simply by adding the proper alcohol or phenol to the product vessel of the recycle technique. In effect, this means converting the recycle technique into a double transesterification technique, namely, first the transesterification of the aryl-substituted phosphite to the trimethyl phosphite, and secondly, the transesterification of the trimethyl phosphite to the desired tertiary phosphite. In view of the unexpected success of this combination, it is apparent that many operating advantages accrue in being able to effect two chemical transformations in a single set of equipment, and with about the same labor requirements as had formerly been required to effect a single chemical transformation.

The double transesterification technique in principle operates in a manner similar to that previously described for the recycle technique except that means are provided to charge the other hydroxy containing material to the product vessel.

During operation, the trimethyl phosphite is transesterified in the product vessel and the methanol and methanol-azeotrope-former recycle to the reaction vessel as before.

Once essentially all of the trimethyl phosphite has been transferred via co-distillation to the product vessel from the reaction vessel, heating is discontinued on the reaction vessel and continued on the product vessel.

Methanol and methanol-azeotrope-former is distilled from the product vessel until essentially no free methanol exists in the product vessel.

The tertiary phosphite present in the product vessel contains possibly methanol azeotrope-former and the hydroxyl material used to transesterify the trimethyl phosphite and can be isolated in a high state of purity by conventional separation techniques such as distillation, fractional distillation, thermal diffusion, crystallization and liquid-liquid extraction. In many instances, it is advantageous to take the tertiary phosphite prior to purification and react it in solution with such chemical reagents as sulfur, oxygen, oxygen-containing gases, nitrogen oxides, alkyl halides, hydrogen chloride, hydrogen bromide, hydrogen iodide, selenium, etc., to produce such products as phosphates, phosphonates, secondary phosphites, phosphorothionates, phosphoroselenonoates, etc., whereupon purification is effected upon the final product. The advantages of the instant invention in producing numerous compounds of value as lubricant additives, insecticide intermediates, insecticides, chemical intermediates, plasticizers, functional fluids, stabilizers for polyvinyl chloride and other chlorine containing polymers, polyolefin polymers, etc., becomes readily apparent.

As can be seen, the present invention can be used effectively to replace one, two or three of the methyl groups in trimethyl phosphite to effect a high yield of the desired products.

Suitable hydroxyl containing materials that can be used in the instant invention include aliphatic alcohols, such as, ethyl, butyl, isopropyl, isobutyl, n-amyl, mixed amyl, decyl, octyl, isooctyl, hexyl, dodecyl, tridecyl, octadecyl-2-butoxyethyl - 3 - nitro propyl, 2 - chloroethyl, 2 - bromoethyl, trifluoroethyl, 2,2,3,3 - tetrafluoro propyl, 2,2,3,3,4,4,5,5 - octafluoro amyl etc. Alkenyl alcohols, such as allyl, methallyl, crotyl, 3 - chloroallyl, cyclic alcohols, such as cyclohexyl, 2-methylcyclohexyl, 3-methylcyclohexyl, cyclopentyl, tetrahydrofurfuryl, furfuryl, etc. Phenols and substituted phenols such as phenol, o-nitrophenol, m-nitrophenol, p - nitrophenol, 2,4,5 - trichlorophenol, o-cresol, m-cresol, p - cresol, p - chlorophenol, o-chlorophenol, 2,4-dichlorophenol, 4 - nitro - 5 - chlorophenol, nonyl phenol, octylphenol, amyl phenol, butyl phenol, etc. These have been presented as typical and are not to be construed as limiting.

Typical of compounds containing two or more hydroxyl groups that can react with the trimethyl phosphite are ethylene glycol, 1,2-propylene glycol, 1,3-propanediol, 1,4-butane diol, 2,3-butylene glycol, 1,2-butylene glycol, trimethylol propane, trimethylol ethane, dipentaerythritol, pentaerythritol, tripentaerythritol, neopentyl glycol, glycerine, 3-chloro-1,2-dihydroxy propane, 1,4-dihydroxy cyclopentene, dimethylol benzene, erythritol, diethylene glycol, triethylene glycol, dipropylene glycol, dibutylene glycol, etc.

As further definition of the type of products that can be obtained from the present invention, the following equations illustrate the types of reactions that can be effected in the product vessel.

1.
$(CH_3O)_3P + CH_3CH_2CH_2CH_2OH \longrightarrow$
$(CH_3O)_2P-OCH_2-CH_2-CH_2CH_3 + CH_3OH$ 2.
$(CH_3O)_3P + 2CH_3CH_2CH_2CH_2OH \longrightarrow$
$CH_3O-P-(OCH_2CH_2-CH_2CH_3)_2 + 2CH_3OH$ 3.
$(CH_3O)_3P + 3CH_3CH_2CH_2CH_2OH \longrightarrow$
$P-(OCH_2CH_2CH_2CH_3)_3 + 3CH_3OH$ 4.
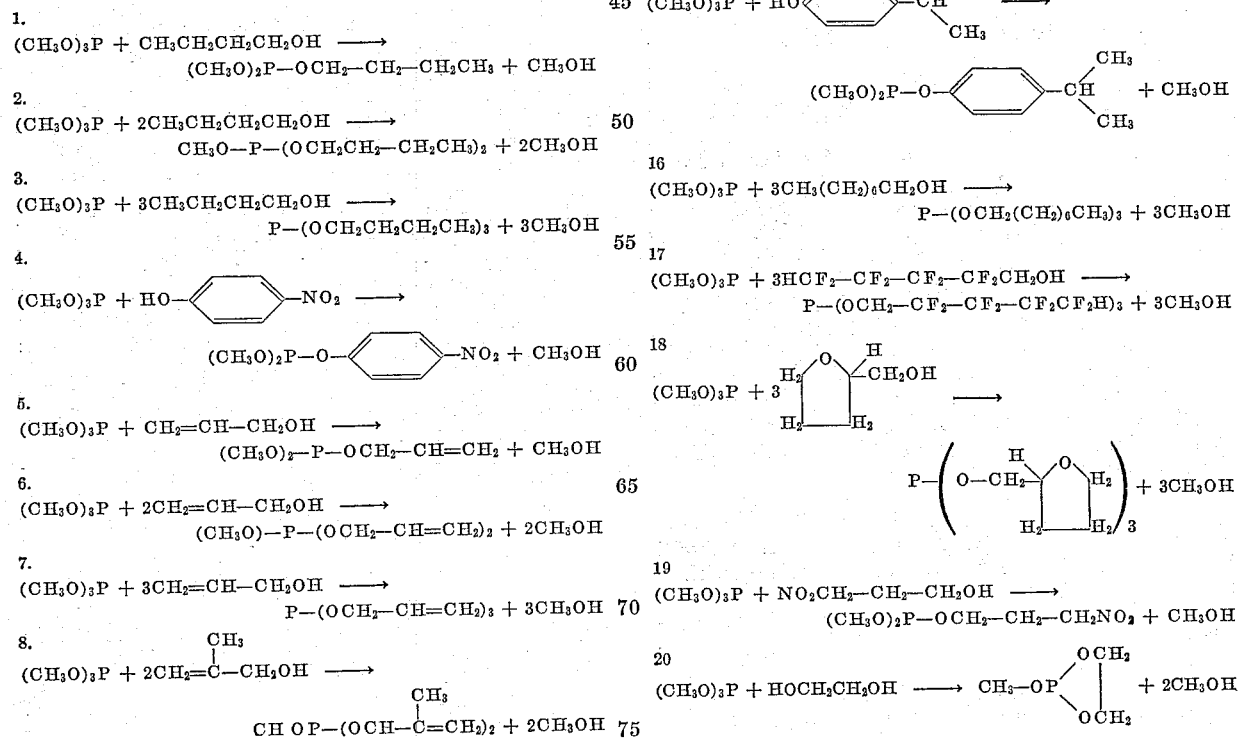

5.
$(CH_3O)_3P + CH_2=CH-CH_2OH \longrightarrow$
$(CH_3O)_2-P-OCH_2-CH=CH_2 + CH_3OH$ 6.
$(CH_3O)_3P + 2CH_2=CH-CH_2OH \longrightarrow$
$(CH_3O)-P-(OCH_2-CH=CH_2)_2 + 2CH_3OH$ 7.
$(CH_3O)_3P + 3CH_2=CH-CH_2OH \longrightarrow$
$P-(OCH_2-CH=CH_2)_3 + 3CH_3OH$ 8.
$(CH_3O)_3P + 2CH_2=\overset{CH_3}{\underset{}{C}}-CH_2OH \longrightarrow$
$CH_3OP-(OCH_2-\underset{}{\overset{CH_3}{C}}=CH_2)_2 + 2CH_3OH$ 9.
$(CH_3O)_3P + 3CH_2=\overset{CH_3}{\underset{}{C}}-CH_2OH \longrightarrow$
$P(OCH_2-\overset{CH_3}{\underset{}{C}}=CH_2)_3 + 3CH_3OH$ 10.
$(CH_3O)_3P + CH_3(CH_2)_8CH_2OH \longrightarrow$
$(CH_3O)_2P-(OCH_2(CH_2)_8CH_3) + CH_3OH$

11.

12.

13.

14.

15.

16.
$(CH_3O)_3P + 3CH_3(CH_2)_6CH_2OH \longrightarrow$
$P-(OCH_2(CH_2)_6CH_3)_3 + 3CH_3OH$ 17.
$(CH_3O)_3P + 3HCF_2-CF_2-CF_2-CF_2CH_2OH \longrightarrow$
$P-(OCH_2-CF_2-CF_2-CF_2CF_2H)_3 + 3CH_3OH$

18.

19.
$(CH_3O)_3P + NO_2CH_2-CH_2-CH_2OH \longrightarrow$
$(CH_3O)_2P-OCH_2-CH_2-CH_2NO_2 + CH_3OH$ 20.
$(CH_3O)_3P + HOCH_2CH_2OH \longrightarrow CH_3-OP\begin{matrix}OCH_2\\ |\\ OCH_2\end{matrix} + 2CH_3OH$

21.

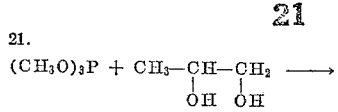

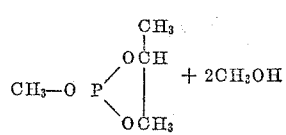

22.

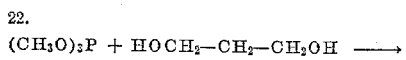

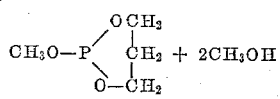

23.

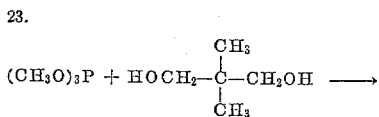

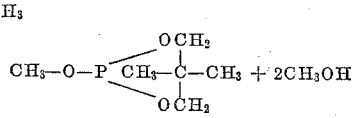

24.

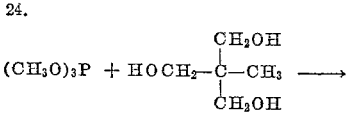

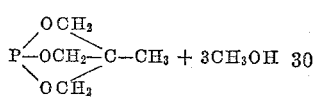

25.

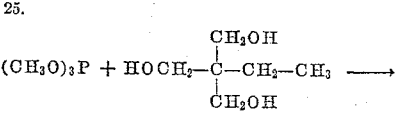

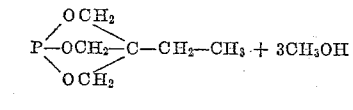

26.

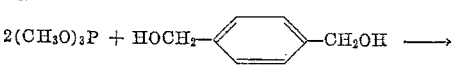

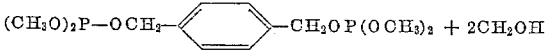

27.

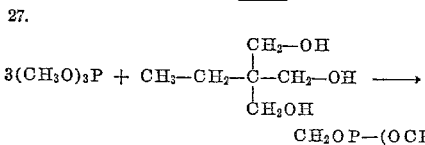

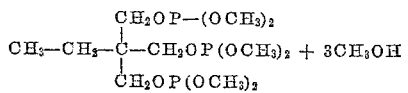

28.

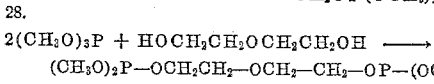

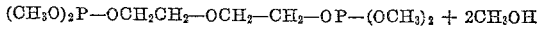

These equations are used to illustrate the typical types of transesterified products that can be produced from trimethyl phosphite using the double transesterification technique in the recycle process or from trimethyl phosphite streams from the batch and continuous techniques.

In addition, other reagents such as mercaptans and thiophenols can be substituted for the hydroxyl containing reactants in the double transesterification technique to produce the corresponding sulfur analog type products.

In addition, trimethyl phosphite and tertiary phosphites produced by the double transesterification technique because of their obtention in high purity are particularly useful as reagents where addition to carbon-carbon double bonds are involved as for example in the case of unsaturated mono and dibasic organic acids, unsaturated glycerides, unsaturated aldehydes, etc., to yield products useful as monomers, plasticizers, lubricant additives, and lubricants.

(6) HYDROLYSIS

If desired, the trimethyl phosphite obtained from aryl containing phosphites by any of the aforementioned batch, recycle or continuous techniques of transesterification and present as distilled material, as a residue product or contained in solution with methanol and/or a methanol-azeotrope-former can be converted into dimethyl hydrogen phosphite of high yield and purity. This conversion can be readily effected by adding water to the aforesaid trimethyl phosphite or trimethyl phosphite solutions with concomitant agitation effected by convental means and at such a rate that the temperature is maintained in the range of about zero degrees to about fifty degrees centigrade and preferably in the range of about twenty to thirty degrees centigrade, with or without cooling depending upon the rate of water addition desired. Reaction temperatures appreciably below about zero degrees centigrade may also be used but would require additional cooling which would make the process less economical and temperatures above about fifty degrees centigrade likewise may also be used, but would have attendant the increased probability of undesirable side reactions such as further hydrolysis of the desired product. The completion of the reaction is determined by the absence of tertiary phosphites (as determined by conventional means), following the addition of about a stoichiometric amount of water; when less than the stoichiometric amount of water is to be added the completion of addition is followed by agitation at the reaction temperature for a period of time of from about one-half to two hours. In the latter event, the use of less than the stoichiometric amount of water would permit the use of somewhat higher temperatures with less probability of hydrolysis of the product dimethyl hydrogen phosphite than would the use of larger proportions of reactant water at these temperatures. Purification of the resulting product, dimethyl hydrogen phosphite, can be effected by conventional methods of distillation, fractionation and the like. The removal of unreacted trimethyl phosphite is facilitated by its co-distillation with methanol, the latter is present as part of the original trimethyl phosphite-methanol solution and as product methanol produced during the reaction or it is present only as product methanol if the trimethyl phosphite used was pure or in solution with other substances such as a methanol-azeotrope-former.

The following examples are presented to define the invention more fully without any intention of being limited thereby. All parts and percentages are by weight unless otherwise specified.

*Example 1*

This example illustrates the batch technique for preparing trimethyl phosphite. The apparatus was comprised of a three-necked, one-liter flask provided with agitation means, a funnel for introducing reactants and methanol into the flask, and a packed column through which gaseous products were removed from the flask. The upper portion of the packed column was connected to a water-cooled condenser, the discharge end of the water-cooled condenser being connected to a collection flask. Triphenyl phosphite (three hundred and ten grams), methanol (one hundred and sixteen grams), and sodium (one gram) were added to the reaction flask, and the flask was heated to a temperature of about one hundred and twenty-five degrees centigrade, while agitating the reactants. The reactants were heated to a temperature between one hundred and twenty-five degrees and one hundred and thirty-five degrees centigrade for about three hours, while continuously adding methanol slowly through the feed funnel. A total of eight hundred and forty milliliters of methanol were added to the reaction flask during this period. As the reaction progressed a gaseous mixture of methanol and trimethyl phosphite passed through the packed column, and was condensed in the water-cooled condenser, and then collected in the product flask. Seven hundred and ninety-three grams of the mixture were collected, which had a weight ratio of methanol to trimethyl phosphite of about 5.3:1. One hundred percent of the phosphorus initially charged through the reaction vessel as triphenyl phosphite was recovered in the product flask as trimethyl phosphite.

*Example 2*

The procedure of Example 1 was repeated with the exception that the temperature during the reaction period was maintained between about ninety and about one hundred degrees centigrade. Methanol was continuously added to the reaction vessel in the amount of eleven hundred and thirty milliliters during the three hour period. After the three hour reaction period, about ninety-three percent of the phosphorus inititlly charged as triphenyl phosphite in the reaction vessel was recovered as trimethyl phosphite in the product flask. The weight ratio of methanol to trimethyl phosphite in the reaction flask was about 6.6:1.

*Example 3*

The procedure of Example 1 was repeated with the exception that the temperature of the reaction vessel was maintained between about seventy-five and about eighty degrees centigrade for about five hours. Methanol in the proportion of eighteen hundred and eighty milliliters was added to the reaction vessel over the five hour period. After five hours about ninety-four percent of the phosphorus initially charged through the reaction vessel as triphenyl phosphite was recovered in the product flask as trimethyl phosphite. The weight ratio of methanol to trimethyl phosphite in the product vessel was about 12:1.

*Example 4*

Trimethyl phosphite was prepared in this example employing the recycle technique. The apparatus for this technique was comprised of a one-liter, three-necked reaction flask, having a feed inlet, an agitator, and a distillation column. The top of the distillation column was connected by means of glass tubing to a water-cooled condenser, the condenser outlet being connected to a product vessel comprised of a one-liter, three necked flask. The product vessel was also provided with an agitator and a distillation column. The top of the distillation column of the product vessel was connected to a water-cooled condenser, the water-cooled condenser being adapted to convey condensate to the feed inlet of the reaction flask. The charge to the reaction flask was comprised of triphenyl phosphite (four hundred and sixty-five grams), methanol (one hundred and fifty-four grams), and sodium (1.5 grams). This was equivalent to a molar ratio of methanol to triphenyl phosphite of 3.2:1. The product flask was charged with methanol (132.5 grams), cyclohexane (one hundred and forty-two grams), and sodium (0.2 gram).

The contents of the reaction flask were heated to a temperature of about one hundred and twenty-five degrees centigrade, and the contents of the product flask were heated to a temperature between about fifty-six and about sixty-one degrees centigrade and these temperatures were maintained for about four hours. During this time the trimethyl phosphite which formed in the reaction flask was vaporized along with methanol and cyclohexane, the resulting gaseous mixture was condensed in the reaction flask condenser, and the resulting condensate was conveyed to the product flask. Simultaneously the methanol and cyclohexane in the product flask were vaporized, the resulting gaseous mixture passed up through the product flask distillation column and was then condensed in the product flask condenser. The resulting condensate was recycled to the reaction flask. Trimethyl phosphite product was collected in the product flask as it was produced during this period. The recycle rate of the methanol-cyclohexane mixture was between about six and about seven milliliters per minute. At the end of the four hour period distillation was stopped, and the product flask was then stripped of cyclohexane and methanol to a pot temperature of one hundred and five degrees centigrade at a pressure of seven hundred and sixty millimeters, and finally at a pot temperature of forty-eight degrees centigrade at a pressure of fifty millimeters. The product flask residue, which predominated in trimethyl phosphite, weighed one hundred and forty-four grams. This material was transferred to a separate vessel, and the cyclohexane and methanol previously stripped from the product flask was condensed and returned to the product flask. The residue in the reaction flask was distilled to remove phenol, which was separated and recycled for reaction with phosphorus trichloride to produce additional triphenyl phosphite. The residue remaining after the separation of the phenol was returned to the reaction flask.

A second run was made of this recycle technique by adding triphenyl phosphite (four hundred and sixty-five grams), methanol (one hundred and fifty-four grams), and sodium (1.5 grams) to the reaction flask. Sodium (0.2 gram) was added to the cyclohexane and methanol in the product flask. The procedure of the first run was repeated for a second four hour period. After stripping cyclohexane and methanol from the product flask residue, a material predominating in trimethyl phosphite (one hundred and sixty-six grams), was collected from the product flask. A third and fourth run were made where one hundred and eighty-seven grams and one hundred and eighty-five grams, respectively, of trimethyl phosphite containing residue were obtained in the product flask. The conversion of phosphorus from triphenyl phosphite to trimethyl phosphite in the product flask in the four runs was sixty-eight percent, seventy-five percent, eighty percent, and ninety-nine percent, respectively. Phosphorus analysis of the trimethyl phosphite product, the reaction flask residue and the product flask residue accounted for ninety-eight percent of the phosphorus initially charged through the system as triphenyl phosphite.

*Example 5*

This example illustrates the continuous technique for preparing trimethyl phosphite. The apparatus employed in this test was comprised of a three-necked, one-liter flask provided with a feed inlet adapted to introduce liquid below the level of the materials to be treated in the flask, an agitator, and a packed distillation column. An outlet means was provided below the level of the material being treated in the flask to continuously remove by-products of the distillation step. The top of the distillation column was connected to a water-cooled condenser and suitable tubing means were provided for connecting the outlet ends of the condenser to a collection flask.

Triphenyl phosphite and methanol were reacted in the presence of sodium methoxide to yield a transesterified mixture containing trimethyl phosphite. The proportions of reactants in the transesterified mixture were equivalent to about three moles of methanol to one mole of triphenyl phosphite, one gram of sodium per mole of triphenyl phosphite, plus an excess of methanol equivalent to a weight ratio of ten grams of methanol per gram of trimethyl phosphite formed. About four hundred and fifty milliliters of this transesterified mixture were fed into the reaction flask, and heated to a temperature of about one hundred and twenty-five degrees centigrade. As the temperature approached this point, additional transesterified mixture was fed to the reaction flask at the rate of about 8.5 milliliters per minute. Simultaneously, a gaseous mixture of trimethyl phosphite and methanol was distilled from the reaction flask through the packed column into the condenser, and the resulting condensate was collected. Also simultaneously a portion of the liquid in the reaction flask was continuously withdrawn. After the distillation unit had reached a steady state, analysis of the mixture of trimethyl phosphite and methanol collected in the collection flask showed that about eighty-eight percent of the theoretical amount of trimethyl phosphite fed into the distillation flask was recovered in the collection flask. The concentration of trimethyl phosphite in the distillate was about eight percent. The remaining twelve percent of the trimethyl phosphite was discharged from the distillation flask along with phenol and some methanol.

The procedure was repeated with the exception that the initial charge to the distillation flask and the material fed to the distillation flask during operation contained an excess of methanol in the proportions indicated in the table below. The rate of addition, the percent conversion of phosphorus at steady state operation, and the concentration of trimethyl phosphite in the distillate are also set forth in the following table.

| Feed, grams methanol/gram trimethyl phosphite | Rate, ml./min. | Phosphorus conversion at steady state in distillate, percent | Percent trimethyl phosphite in distillate |
|---|---|---|---|
| 10 | 8.5 | 88 | 8 |
| 5 | 8.5 | 73 | 15 |
| 3.4 | 8.5 | 67 | 18 |
| 1.7 | 8.5 | 55 | 28 |
| 1.0 | 25.0 | 43 | 32 |
| 0.5 | 8.5 | 33 | 38 |

These results show that as the quantity of methanol is reduced, the conversion of trimethyl phosphite at steady state decreases, but the concentration of trimethyl phosphite in the distillate increases.

*Example 6*

To the reaction flask of the apparatus of Example 4 was added a charge of triphenyl phosphite (three hundred and ten grams), methanol (two hundred and fifty-six grams), and sodium (one gram). Methanol (three hundred and eight-four grams) and sulfur (forty-eight grams) were added to the product flask. Both the reaction flask and the product flask were heated to maintain a rapid continuous recycling of methanol throughout the system. After six hours of recycling of methanol the operation was discontinued. The material collected in the product flask contained trimethyl phosphorothioate. This material was filtered to remove unreacted sulfur and then stripped to a pot temperature of seventy degrees centigrade at twenty millimeters of mercury. The residue, which weighed one hundred and thirty grams, was found to contain greater than ninety-five percent trimethyl phosphorothionate by infrared analysis and greater than ninety-nine percent trimethyl phosphorothionate by phosphorus analysis. The product yield, based upon the phosphorus content in the triphenyl phosphite originally charged to the reaction flask, was about eighty-four percent.

*Example 7*

To the recycle technique apparatus of Example 4 there was added to the reaction flask a charge of triphenyl phosphite (two hundred and thirty-three grams), methanol (75.5 grams), and sodium (one gram). The molar ratio of methanol to triphenyl phosphite in the charge was equivalent to about 3.05:1. Methanol (one hundred and fifty grams), and powdered selenium (59.2 grams) were charged to the product flask. The contents of the reaction flask were heated to a temperature of about one hundred and twenty-five degrees centigrade for about four hours. After this the material collected in the product flask which contained trimethyl phosphoroselenonoate was then filtered to remove unreacted selenium, and then stripped to a pot temperature of about seventy-five degrees centigrade at ten millimeters of mercury to remove methanol. The residue was then distilled at a temperature between about fifty-one and fifty-three degrees centigrade at 1.5 millimeters of mercury to yield trimethyl phosphoroselenonoate of greater than ninety-five percent purity and in a yield of greater than ninety-five percent. The phosphorus analysis of the product was 15.0 percent.

*Example 8*

To the reaction flask of the recycle technique apparatus of Example 4 there was added a charge of triphenyl phosphite (four hundred and sixty-five grams), methanol (one hundred and fifty-one grams) and sodium (two grams). The product flask of this apparatus was charged with methanol (seventy-four grams), allyl alcohol (two hundred and seventy-five grams), cyclohexane (one hundred and twenty-six grams) and sodium (0.5 gram). The material in the reaction flask was heated to a temperature of about one hundred and twenty-five degrees centigrade, to maintain a rapid continuous recycling of the methanol-cyclohexane azeotrope throughout the system. After seven hours of recycling the heating was stopped and the mixture in the product flask was stripped to a pot temperature of one hundred and twenty degrees centigrade at seven hundred and sixty millimeters of mercury, and subsequently to a temperature of eighty degrees centigrade at ten millimeters of mercury. The residue (one hundred and ninety-four grams), was found to contain greater than ninety-five percent triallyl phosphite by infrared and phosphorus analysis. The triallyl phosphite had a refractive index at twenty-four degrees centigrade of 1.4550.

*Example 9*

The apparatus employed in this example was a two hundred and fifty milliliter, three-necked flask provided with a condenser, a thermometer, a heating mantle and a stirrer. Air was pumped through a line equipped with a rotometer which communicated with a gas dispenser positioned in the bottom of the flask. Two hundred and two grams of triallyl phosphite (one mole), prepared as in Example 8 were added to the flask, and air was fed through the gas dispenser, while agitating the triallyl phosphite, at a rate of about three hundred milliliters per minute. The triallyl phosphite was maintained at a temperature of about one hundred degrees centigrade for about seven hours. After this period a portion of the residue was analyzed by infrared analysis and was found to contain ninety-five percent triallyl phosphate. The refractive index of the sample of the residue at twenty-four degrees centigrade was 1.4495. The total residue weighed two hundred and ten grams, which was equivalent to 96.4 percent triallyl phosphate.

*Example 10*

A twelve-liter, three-necked round-bottom flask equipped with a mechanical stirrer, heating mantle, thermometer, eighteen inch by three-quarter inch helix-packed distillation column, K distillation head, condenser, and receiver was charged with two thousand, six hundred and twenty-four grams (twenty-one moles) of trimethyl phosphite, prepared as in Example 1, five thousand and eighty-four grams of n-butanol, ten grams of sodium, and two thousand eight hundred and eighty grams of cyclohexane.

The reactants were then heated to eighty degrees centigrade at which point the cyclohexane-methanol azeotrope distilled off at a head temperature of fifty-five degrees centigrade. Eighteen hours were required to remove all the azeotrope. Water-aspirator vacuum was then applied to the system to remove the last traces of unreacted trimethyl phosphite and butanol with the final conditions being one hundred and nine degrees centigrade pot temperature at seventeen millimeters Hg. At this point the helix-packed column was removed and a six inch Vigreux column inserted in its place. The tri-n-butyl phosphite was then distilled. (Pot temperature of one hundred and forty to one hundred and fifty-two degrees centigrade, head temperature of one hundred and forty to one hundred and forty-six degrees centigrade at seventeen to twenty millimeters Hg pressure.) Four thousand, eight hundred and seventy-four grams of product were recovered which was equivalent

Example 11

Anhydrous hydrogen chloride gas was reacted with fifteen hundred grams (six moles) of tri-n-butyl phosphite (prepared as in Example 10) in a three-liter, round-bottom flask, equipped with a gas delivery tube, thermometer, mechanical stirrer, reflux condenser and a Dry Ice-acetone cooling bath. The exothermic reaction was controlled at minus ten degrees centigrade for the entire two and one quarter hour hydrogen chloride addition period. On completion of the reaction, water-pump aspirator vacuum was applied to remove the by-product butyl chloride and any excess dissolved hydrogen chloride. This stripping process was expedited by increasing the pot temperature. Final stripping conditions were one hundred and twenty-seven degrees centigrade pot temperature; forty-seven degrees centigrade head temperature at thirteen millimeters Hg pressure. The product was then distilled from the same equipment, since no fractionating column was necessary. Boiling point of the product was one hundred and twenty-two to one hundred and twenty-five degrees centigrade at twelve millimeters Hg pressure. The final yield of dibutyl hydrogen phosphite was eleven hundred and twenty-seven grams or 96.5 percent of theory. Phosphorus analysis showed the produced to contain 15.9 percent phosphorus. (Theoretical phosphorus is 16.0 percent.)

Example 12

Trimethyl phosphite, 124.0 grams (1.0 mole), prepared in a manner similar to Example 1, was cooled to between about minus twenty to minus ten degrees centigrade, purged with nitrogen and then treated with dry hydrogen chloride until 36.5 grams (1.0 mole), was absorbed. The solution was then stirred for thirty minutes and stripped of methyl chloride and any residual hydrogen chloride present under vacuum, while maintaining the temperature during this period at between about minus twenty to minus ten degrees centigrade. When the stripping was complete, the residual liquid was distilled at ten millimeters, giving the following fractions: (a) 3.4 grams, boiling point fifty-one to fifty-five degrees centigrade, $N_d^{25}$ 1.4002, (b) 93.0 grams, boiling point fifty-seven to fifty-eight degrees centigrade, $N_d^{24.5}$ 1.3992, (c) 0.2 gram undistilled residue, and (d) 8.5 grams trap contents, $N_d^{24.5}$ 1.4042. The combined forecut (a) and trap contents (d) were found to contain 9.0 grams of trimethyl phosphite, which amounts to about seven percent of the trimethyl phosphite initially charged. The main cut (b) consisted of dimethyl hydrogen phosphite of ninety-five to ninety-six percent purity in a yield of about ninety-three percent. At test of the dimethyl hydrogen phosphite product for chloride ion was nil, and the acidity was less than 1.2 mg. KOH per gram.

Example 13

Water was added in small portions to 124.0 grams (1.0 mole) of trimethyl phosphite (prepared in a manner similar to Example 1) while the reaction was completed, as determined by a negative test for phosphite. A total of 17.1 grams (0.95 mole) of water was required. The methanol produced in the reaction was then distilled under atmospheric pressure, followed by the dimethyl hydrogen phosphite at ten millimeters. The dimethyl hydrogen phosphite product was a colorless liquid, boiling point fifty-five to fifty-seven degrees centigrade at ten millimeters, $N_d^{21.5}$ 1.4001. The purity of the product was ninety-six percent, and the yield was ninety-four percent.

*Anal.*—Calcd. for $C_2H_7O_3P$: percent P=28.2. Found: 28.0.

Example 14

Dimethyl methylphosphonate (one thousand and twenty-five grams, 8.27 moles) was charged into a twelve-liter, round-bottom flask equipped with a mechanical stirrer, an addition funnel, and an efficient condenser leading to a Dry Ice trap and heated with agitation to one hundred and thirty-five degrees centigrade. A mixture of trimethyl phosphite and methyl iodide containing about 4.65 moles (six hundred and sixty grams) of methyl iodide and ninety-one moles (eleven thousand, two hundred and seventy-nine grams) of trimethyl phosphite was then added at such a rate that the pot temperature remained in the range between about one hundred and fifty to one hundred and seventy degrees centigrade. The addition of this mixture took about four and one-half hours.

The material was then distilled at about sixty millimeters pressure through a six-inch Vigreux column. The fractions collected boiled up to 105.5 degrees centigrade at about sixty millimeters and analyzed from ninety-five to ninety-eight percent pure dimethyl methylphosphonate by vapor phase chromatographic analysis. The dimethyl methylphosphonate contained in the combined distillates amounted to about eleven thousand, one hundred and thirteen grams, 89.7 moles or about ninety percent of the trimethyl phosphite originally charged. In addition, the residue consisted of about ninety-five percent dimethyl methylphosphonate (by vapor phase chromatographic analysis), bringing the total phosphonate accounted for up to eleven thousand, five hundred and fifty grams or 93.2 moles for an overall yield of about ninety-four percent.

Example 15

Dimethyl methylphosphonate was prepared from trimethyl phosphite in a pressure bomb. The bomb had a volume of fourteen hundred milliliters and was glass lined. The charge to the bomb comprised one hundred and nineteen grams of cyclohexane, one hundred and twelve grams of methanol, one hundred and twelve grams of trimethyl phosphite and fourteen grams of methyl iodide. After the ingredients were placed in the bomb, the bomb was immersed in an oil bath maintained at a temperature of one hundred and twelve degrees centigrade, and the bomb was retained in the bath for about two hours. A pressure of about five atmospheres developed during this time. The bomb was removed from the bath and the contents were then distilled. The residue weighed 108.5 grams and contained 86.5 percent dimethyl methylphosphonate and 13.5 percent dimethyl hydrogen phosphite. Conversion of the trimethyl phosphite to the phosphonate was about eighty-five percent. Two additional tests were carried out employing the same technique with the exception that the proportion of methyl iodide was twenty-eight grams and sixty-four grams, respectively. Similar results were obtained in these tests.

Example 16

The procedure of Example 15 was repeated with the exception that the charge to the bomb was comprised of two hundred and twenty-four grams of cyclohexane, one hundred and twelve grams of trimethyl phosphite, and fourteen grams of methyl iodide. The oil bath was maintained at a temperature of one hundred and twenty-five degrees centigrade, and the bomb immersed in this bath for four and one-half hours. The contents of the bomb after this treatment was subjected to distillation, and the distillation residue weighed 108.7 grams. The distillation residue contained 98.6 percent dimethyl methylphosphonate, and represented a yield of about ninety-six percent.

Example 17

Dimethyl methylphosphonate was prepared in this example by a continuous process. The apparatus was comprised of two three-necked, five hundred milliliter flasks. The first flask was provided with a feed funnel for continuously adding trimethyl phosphite and methyl iodide, an agitator, a Dry Ice condenser and a feed inlet for introducing vapors from the second flask to below the level of the liquid reactants in the first flask. The first flask was also provided with a discharge line positioned below the liquid level of reactants. The discharge line from the first flask was also provided with a Dry Ice condenser. This discharge line, after passing through the Dry Ice condenser, was connected to the second flask with means for introducing liquid from the first flask to the bottom of the second flask. The second flask was provided with an agitator, and a vapor outlet means which connected with the first flask. The second flask was also provided with a discharge line positioned below the level of the liquid reactants. This discharge line, or product line, was also provided with a Dry Ice condenser. The charge to the first flask was comprised of a heel of three hundred grams of dimethyl methylphosphonate containing 2.84 grams of methyl iodide. The second flask was charged with two hundred and thirty grams of dimethyl methylphosphonate. A mixture of twelve hundred milliliters of trimethyl phosphite and 1.7 grams of methyl iodide (0.125 mole percent), was added by means of the feed funnel to the bottom of flask No. 1 at the rate of about five milliliters per minute for about four hours. Dimethyl methylphosphonate product was continuously withdrawn from the product line of flask No. 2 at the same rate during this period. The temperature in flask No. 1 during this period was between about one hundred and fifty and one hundred and seventy degrees centigrade, and was maintained within this temperature range by the exothermic reaction which took place in flask No. 1. The temperature of flash No. 2 was maintained at about one hundred and fifty degrees centigrade by an external heat source. During the four hour reaction period, eleven hundred and eighty-five milliliters of product were obtained. This product was substantially pure dimethyl methylphosphonate containing less than about one percent trimethyl phosphite.

*Example 18*

A total of nine hundred and eighty grams of tributyl phosphite obtained from the transesterification of trimethyl phosphite which in turn was prepared via the transesterification of tricresyl phosphite with methanol in the presence of a catalyst, was charged to a five-liter, round-bottom, three-necked flask equipped with a heating mantle, stirrer and reflux condenser. In addition, forty-nine grams of n-butyl bromide was added and the reaction mixture was heated with agitation to a temperature of one hundred and ninety to two hundred and ten degrees centigrade over a period of four hours at which time all of the phosphite had been consumed as evidenced by the mixture's failure to decolorize an iodine solution. The butyl bromide was distilled as a foreshot under reduced pressure and the dibutyl butylphosphonate product was distilled at a temperature of one hundred and forty-five to one hundred and fifty degrees centigrade at eight to ten millimeters Hg pressure to yield nine hundred and thirty grams of high purity product. This represented an actual yield of about ninety-five percent of theory.

*Example 19 (tridecyl phosphite)*

A mixture of four hundred and seventy-five grams (three moles) of iso-decanol, one hundred and fifty-five grams (1.25 moles) of trimethyl phosphite, one hundred and sixty-two grams of cyclohexane, and one gram of sodium hydride were charged to a mechanically stirred, two-liter flask equipped with a thermometer and a fractionating column (one inch in diameter, twelve inches long, filled with one-eighth of an inch glass helices) adiabatically heated with a nichrome wire wrapped heating jacket. The column was equipped with a fraction cutter, reflux condenser, and suitable collection vessels.

The reaction mixture was heated and stirred, and methanol was removed as methanol-cyclohexane azeotrope at conditions of seventy-three to one hundred and twenty-five degrees centigrade in the pot and fifty-five degrees centigrade in the head at atmospheric pressure using about 2:1 reflux ratio. Fifty additional grams of cyclohexane were added to complete removal of the theoretical amount of azeotrope (two hundred and fifty-eight grams), which corresponded to ninety-six grams of methanol.

The reaction mixture was then vacuum stripped of all volatiles to ultimate conditions of one hundred and eighty degrees centigrade in the pot at 1.5 millimeters at which time the excess trimethyl phosphite (about thirty grams) was recovered.

The reaction mixture was then treated with about three percent by weight of decolorizing carbon and about one percent by weight of filter aid and then filtered to yield a slightly amber tridecyl phosphite as a mobile oil in nearly theoretical yield having a density at twenty-five degrees centigrade of 0.893 and a refractive index at twenty-five degrees centigrade of 1.450. This material was nearly odorless, and lacked the sharp odor of iso-decanol usually present in tridecyl phosphites derived by other methods from this alcohol.

Infra-red analyses confirmed the qualitative identity of this product, and its equivalence to tridecyl phosphite obtained by another synthetic route.

*Example 20*

The apparatus employed was a twenty-two liter, round-bottom flask, equipped with a mechanical stirrer, thermometer, eighteen inch by three-quarter inch helix-packed distillation column, K distillation head, condenser, and receiver. To the flask were added four thousand, three hundred and fifty grams of cyclohexane, thirty grams of sodium, eight thousand, three hundred and twenty grams of amyl alcohol (94.5 moles), and three thousand, eight hundred and eighty grams of trimethyl phosphite, (thirty moles of ninety-six percent pure trimethyl phosphite). The flask was heated to a temperature in the range between seventy-three and one hundred and ten degrees centigrade for a period of thirteen hours to remove by distillation all the cyclohexane-methanol azeotrope. After vacuum stripping to remove any unreacted alcohol and trimethyl phosphite, the product was distilled. Conditions for the distillation were as follows: the temperature of still body varied between one hundred and thirty and one hundred and thirty-six degrees centigrade, and the head temperature varied between one hundred and eighteen and one hundred and twenty-seven degrees centigrade at 0.15 to 0.55 millimeter Hg pressure. Final yield of triamyl phosphite was eight thousand, two hundred and seventy grams which was 94.5 percent of theory. The product contained 10.5 percent phosphorus. (Theory=10.6 percent.)

*Example 21*

A twelve-liter, round-bottom flask, equipped with a thermometer, mechanical stirrer, and reflux condenser, was charged with seven hundred and eighty-three grams of freshly distilled amyl bromide (5.2 moles), and six thousand, eighty hundred and ten grams (23.3 moles) of triamyl phosphite which had been prepared from trimethyl phosphite in Example 20. The reactants were then heated to one hundred and eighty-five degrees centigrade where a slight exotherm occurred. The reaction was held at a temperature between one hundred and seventy and one hundred and eighty degrees centigrade for a period of fifteen hours until the phosphite content of the flask was nil. The amyl bromide was then distilled at water aspirator vacuum, the maximum pot temperature being one hundred and fifty-four degrees centigrade, the head temperature varying between twenty-five degrees centigrade and sixty-three degrees centigrade at from twelve to thirty millimeters Hg pressure. The product was then distilled at a pot temperature of one hundred and forty degrees to one hundred and sixty-five degrees centigrade, a head temperature of one hundred and eighteen degrees centigrade to one hundred and fifty-five degrees centigrade at pressures of 0.3 to 0.75 millimeter Hg. Final yield of diamyl amylphosphonate was six thousand, seven hundred and four grams or ninety-eight percent of theory. The product contained 10.6 percent phosphorus. (Theory=10.6 percent.)

Example 22

In this example, the recycle technique apparatus similar to Example 4 was employed, wherein the reaction flask and product flask each had a volume of twelve liters. The reaction flask was charged with five thousand, five hundred and ninety-five grams of triphenyl phosphite (eighteen moles), two thousand and seventy grams of methanol (64.5 moles), and twenty-seven grams of sodium. The product flask was charged with three thousand, eight hundred and seventy grams of methallyl alcohol (fifty-four moles), two thousand grams of cyclohexane, one hundred grams of methanol, and ten grams of sodium. The two flasks were heated to boiling and the recycle started. The pot temperature of the reaction flask was maintained between one hundred and fifteen degrees centigrade and one hundred and thirty degrees centigrade, and the head temperature varied between sixty and seventy-two degrees centigrade. The product flask was held between sixty-nine and eighty-one degrees centigrade, and the head temperature varied between fifty-three degrees centigrade and fifty-five degrees centigrade. This recycle system was run for a period of thirteen hours, after which the product flask was removed from the system and distilled to obtain the trimethallyl phosphite. The product was first stripped at atmospheric pressure to a pot temperature of ninety degrees centigrade, then partial vacuum was applied and the stripping was continued to a final pot temperature of one hundred degrees centigrade and a head temperature of fifty-nine degrees centigrade at fifteen millimeters Hg pressure. This stirpping operation removed all the remaining cyclohexane, methanol, trimethyl phosphite, and unreacted methallyl alcohol. The product was then distilled at 0.15 millimeter Hg at pot temperatures of from eighty-four to ninety-two degrees centigrade, and head temperatures of from seventy-seven degrees centigrade to eighty-one degrees centigrade. Two thousand, four hundred and eighty-two grams of trimethallyl phosphite were obtained which was equal to fifty-seven percent of theory. An assay of the product showed it to be ninety-seven percent trimethallyl phosphite by iodine-titration.

Example 23

In a two-liter, round-bottom flask equipped with thermometer, heating mantel, mechanical stirrer and reflux condenser, nine hundred and eight grams of trimethallyl phosphite were mixed with 1.6 grams of sodium iodide. The trimethallyl phosphite was prepared by transesterification with trimethyl phosphite and methallyl alcohol, as described in Example 22. The reactants were heated to one hundred and sixty-five degrees centigrade, where an exotherm occurred. This exotherm was allowed to carry the temperature up to one hundred and eighty-five degrees centigrade, where the reaction was maintained for one and one-half hours. At this point, the conversion of the phosphite to phosponate was complete. The product was then distilled at 0.1 millimeter Hg, at a pot temperature between one hundred and one hundred and fifty degrees centigrade and a head temperature of eighty-five to ninety-two degrees centigrade. Six hundred and sixty-five grams of dimethallyl methallylphosphonate were obtained and this amounted to seventy-three percent of theory. The product contained 12.8 percent phosphorus. (Theory=12.6 percent.)

Example 24

One thousand grams of trimethallyl phosphite (prepared as in Example 22), five hundred and eighty-three grams of water and 17.5 grams of sodium carbonate were mixed in a three-liter, round-bottom flask, equipped with a mechanical stirrer, a dropping funnel, a thermometer, a reflux condenser, and a cooling bath. To this mixture, four hundred and eighty grams of thirty percent $H_2O_2$ were slowly added dropwise. The exothermic reaction was maintained at thirty-five degrees centigrade by means of the cooling bath. After the four hour reaction was complete, the organic layer was washed with sodium bisulfite solution until all the excess hydrogen peroxide had been consumed as indicated by a negative test with KI-starch test paper. The organic layer was then filtered and distilled through a six inch by three-quarter inch Vigreux column at 0.20 millimeter Hg at a pot temperature of one hundred and nineteen to one hundred and thirty degrees centigrade and a head temperature of one hundred and eight to one hundred and twelve degrees centigrade. Nine hundred and two grams of trimethallyl phosphate were obtained. This equalled eighty-five percent of theoretical yield.

Example 25

Trimethyl phosphite (one thousand, four hundred and twenty-two grams), obtained from the transesterification of triphenyl phosphite under basic catalysis with excess methanol was charged to a five-liter, round-bottom, three-necked flask, equiped with a thermometer, heating mantle, and a four-foot glass, helix packed, fractionating column. In addition, two thousand, two hundred and sixty-five grams of n-propyl alcohol and nine grams of sodium metal were also charged. The reactants were heated two hours at eighty-one degrees centigrade and the distillate collected was found to contain considerable trimethyl phosphite (4.7 percent). To prevent this loss, one thousand, six hundred and sixty grams of cyclohexane were added to the reactor. The cyclohexane-methanol azeotrope was then completely removed by heating the pot from seventy-five to one hundred and twenty-one degrees centigrade over a period of seven hours. During this distillation, the head temperature varied between fifty-three and eighty-six degrees centigrade. The tri-n-propyl phosphite was then distilled at a pot temperature of one hundred and seven degrees centigrade, head temperature of one hundred and one to one hundred and six degrees centigrade at twenty-four millimeters Hg pressure. Sixteen hundred and thirty-seven grams of product were obtained which was equivalent to sixty-nine percent of theory. The product contained 14.8 percent phosphorus. (Theory=14.9 percent.)

Example 26

Employing the equipment of Example 25, fifteen hundred and thirty grams (33.4 moles) ethanol, twelve grams sodium and thirteen hundred and seventy-four grams (eleven moles) trimethyl phosphite were mixed. The trimethyl phosphite was obtained from the transesterification of triphenyl phosphite under basic catalysis with excess methanol. Fifteen hundred and ninety-three grams of cyclohexane were added to prevent loss of trimethyl phosphite during the distillation of the by-product methanol. After thirteen hours of holding the reactor at a temperature of sixty-six to one hundred and thirteen degrees centigrade to remove the cyclohexane-methanol azeotrope at a head temperature of fifty-five to seventy degrees centigrade, water aspirator vacuum was applied and the product distilled. The pot temperature varied between fifty-three and seventy-nine degrees centigrade, and the head temperature between forty and seventy-eight degrees centigrade and the pressure between twenty millimeters and seventy millimeters Hg. Crude yield was 83.5 percent of theory, but purity of the product was only eighty-two percent necessitating refractionation. On purification of the product by refractionation, the yield was reduced to fifty-nine percent of material having a purity of ninety percent. The product contained 19.3 percent phosphorus. (Theory=18.7 percent.)

Example 27

In a two-liter, round-bottom flask, equipped with a mechanical stirrer, thermometer, distillation column, condenser, receiver and heating mantel, two hundred and forty-eight grams of trimethyl phosphite, one gram of sodium, seven hundred and twenty grams of methyl carbitol (six moles), and one hundred and fifty grams of cyclohexane were mixed. The temperature of the pot was held between eighty-four to one hundred and forty-five degrees centigrade to remove the cyclohexane-methanol azeotrope. Vacuum was then applied to the system and the pot temperature was raised to one hundred and sixty degrees centigrade, at 0.35 millimeter Hg to remove any unreacted trimethyl phosphite and methyl carbitol present.

The product, tri(2-methoxyethoxy)ethyl phosphite was isolated as the distillation residue and was found to contain 8.6 percent phosphorus. (Theory=8.0 percent.)

Example 28

Trimethyl phosphite was prepared on a commercial scale by transesterifying triphenyl phosphite with an excess of methanol in the presence of a basic catalyst. The trimethyl phosphite had a purity of ninety-nine percent. Two hundred and five gallons of this trimethyl phosphite was placed in a reaction vessel, and four hundred and seventy-six pounds of sulfur in granular form was added slowly to the trimethyl phosphite with agitation. The temperature of the reaction mass was maintained below seventy degrees centigrade. After all of the sulfur was added and the reaction complete, the mixture was filtered to yield two hundred and eleven gallons of trimethyl phosphorothionate. The product had a purity of 98.6 percent, and represented a yield of ninety-five percent.

Example 29

The recycle apparatus employed in Example 4 was used in this example, with the exception that two-liter flasks were employed as the reaction flask and the product flask. The reaction flask was charged with nine hundred and thirty grams of triphenyl phosphite, four hundred and eighty grams of methanol, and three grams of sodium. The product flask was charged with four hundred and three grams of methanol, four hundred and twenty-six grams of cyclohexane, and one gram of sodium. The reaction flask was heated to a temperature of one hundred degrees centigrade and maintained at approximately that temperature throughout the run. A reflux ratio of about 1:3 was maintained throughout the run (four milliliters of reflux to eleven milliliters of product). After two hours of operation, the product flask was removed from the system and analyzed for trimethyl phosphite content. The flask was then replaced, operation was continued for an additional two hours, and the product flask contents were again analyzed. This procedure was repeated at two hour or three hour intervals for a total of twelve hours. The reaction flask at the end of twelve hours of operation contained one thousand and thirty-nine grams, and the product flask contained one thousand and forty-two grams. The concentration of trimethyl phosphite in the product flask was thirty-five percent. The percent conversion at the various time intervals of operation were as follows:

| Hours of operation: | Percent conversion to trimethyl phosphite |
|---|---|
| 2 | 48 |
| 4 | 67 |
| 6 | 86 |
| 9 | 92 |
| 12 | 98 |

The concentration of trimethyl phosphite at the top of the product column after twelve hours of operation was 0.4 percent.

Example 30

The procedure of Example 29 was repeated with the exception that the cyclohexane charge to the product flask was replaced with four hundred and eighty-one grams of toluene. The process was operated for a total of six hours, with the product flask being analyzed after two, four and six hours of operation. After six hours of operation, the reaction flask contained eleven hundred and fifty-nine grams, and the product flask contained one hundred and five grams. The concentration of trimethyl phosphite in the product flask was twenty-nine percent. After two hours of operation, there was a fifty-five percent conversion of trimethyl phosphite to the product flask, after four hours, there was a conversion of seventy-two percent, and after six hours there was a conversion of seventy-eight percent. The concentration of trimethyl phosphite at the top of the product column after six hours of operation was 1.7 percent trimethyl phosphite.

Example 31

The procedure of Example 29 was repeated with the exception that the cyclohexane was replaced with five hundred grams of octane. After six hours of operation, the reaction flask contained eleven hundred and twenty-two grams, and the product flask contained one thousand and forty-seven grams. After two hours of operation, there was a fifty-four percent conversion to trimethyl phosphite in the product flask, after four hours there was a conversion of sixty-seven percent, and after six hours there was a conversion of seventy-six percent. The concentration of trimethyl phosphite at the top of the product column after six hours of operation was 3.0 percent.

Example 32

The procedure of Example 29 was repeated with the exception that the cyclohexane in the product flask was replaced with four hundred and ninety-four grams of methyl cyclohexane. The operation was carried out for a period of about eight hours. At the end of this period the reaction flask contained one thousand and eighteen grams, and the product flask contained eleven hundred and fifty-seven grams. The concentration of trimethyl phosphite in the product flask at the end of the eight hour period was 31.7 percent. The percent conversion to trimethyl phosphite in the product flask at various time intervals were as follows:

| Hours: | Percent conversion to trimethyl phosphite |
|---|---|
| 2 | 51 |
| 4 | 72 |
| 6 | 93 |
| 8 | 99 |

The concentration of trimethyl phosphite at the top of the product column after eight hours of operation was 0.5 percent.

Example 33

A procedure similar to that of Example 29 was employed with the exception that the reaction flask was charged with three hundred and fifty-two grams of tricresyl phosphite, one hundred and sixty grams of methanol and one gram of sodium, and the product flask was charged with two hundred and fifty grams of methanol, two hundred and fifty grams of benzene, and 0.5 gram of sodium. After three hours of operation, the reaction flask contained four hundred and twenty grams and the product flask contained five hundred and forty-one grams. The concentration of trimethyl phosphite in the product flask at the end of this period was twenty percent. After two hours of operation there was eighty percent conversion of trimethyl phosphite in the product flask, and after three hours of operation there was eighty-seven percent conversion. The concentration of trimethyl phosphite at the top of the product column after three hours of operation was 0.2 percent.

*Example 34*

The apparatus was comprised of a three-necked, one-liter flask provided with agitation means, a funnel for introducing reactants and methanol into the flask, and a packed column through which gaseous products were removed from the flask. The upper portion of the packed column was connected to a water-cooled condenser, the discharge end of the water-cooled condenser being connected to a collection flask. Phenyl dimethyl phosphite (one hundred and eighty-six grams), methanol (thirty-five grams), and sodium (one gram) were added to the reaction flask. The flask was heated to a temperature of about one hundred and twenty-five degrees centigrade, while under agitation. The reaction mixture was then cooled to eighty degrees centigrade and held at this temperature for a period of two and one-half hours while a total of eight hundred and forty-three grams were added at a uniform rate to the reaction mixture. The co-distillate of the methanol and trimethyl phosphite had a weight ratio of about 7.4 to one.

*Example 35*

The procedure of Example 34 was repeated with the exception that the temperature during the co-distillation step was maintained at about one hundred degrees centigrade. Methanol was continuously added to the co-distillation vessel in a quantity equal to eight hundred grams during a two hour period and there was collected a total quantity of co-distillate equal to six hundred and fifty-four grams. This represented a methanol to trimethyl phosphite weight ratio of about 4.5 to one and a recovery of the available phosphorus of about ninety-six percent.

*Example 36*

The procedure of Example 34 was repeated with the exception that the temperature during the co-distillation step was maintained at about one hundred and twenty-five degrees centigrade. Methanol was continuously added to the co-distillation vessel in a quantity equal to three hundred and eighteen grams during a one hour period and a co-distillate was collected in quantity equal to four hundred and twenty grams. The weight ratio of methanol to trimethyl phosphite in the co-distillation was about 2.4:1 and the contained trimethyl phosphite represented a recovery of available phosphorus of about ninety-nine percent.

*Example 37*

The apparatus was comprised of a two hundred and fifty milliliter, three-necked flask equipped with a stirrer, gas bubbler, thermometer, water condenser and Dry Ice trap. Trimethyl phosphite (104.5 grams) prepared by the recycle technique and two grams of aluminum oxide were added to the flask. The reaction mixture was heated to ninety degrees centigrade and air was bubbled through the reaction mixture under agitation at a rate of about ninety milliliters per minute for nineteen hours. This produced essentially little oxidation and the temperature was raised to from about one hundred and fifteen degrees centigrade to about one hundred and seventy-three degrees centigrade over a period of fourteen and one-half hours while maintaining the air rate at about ninety milliliters per minute. There was isolated an eighty-five percent yield of trimethyl phosphate based on the forty-nine percent of trimethyl phosphite that had been converted.

*Example 38*

Apparatus similar to that of the recycle technique used in Example 4 was employed in this example. Triphenyl phosphite (nine hundred and thirty grams), methanol (eleven hundred and seventy-one grams), cyclohexane (four hundred and twenty-six grams) and sodium (four grams) were charged to the reaction flask. The reactants were heated to a temperature of eighty degrees centigrade and maintained at this temperature for a period of twelve hours to effect co-distillation. One thousand, two hundred and thirty eight grams of condensate was collected in the product vessel having a trimethyl phosphite concentration of about twenty-nine percent. This represented a yield of trimethyl phosphite of about ninety-six percent.

An aliquot of five hundred and five grams of this condensate was charged to a fractionation apparatus that was equipped with a four foot by one and one-half inch fractionation column packed with one-quarter inch glass helices. The distillation was effected at atmospheric pressure initially at a two to one reflux ratio until the azeotrope of methanol and cyclohexane was removed. The reflux was then charged to five to one until a body temperature of one hundred and eleven degrees centigrade was reached in the still. At this point the still residue was equal to one hundred and one grams of material which, after analysis was found to be trimethyl phosphite of about 98.7 percent purity.

*Example 39*

To the reaction flask of the apparatus of Example 4 was added a charge of triphenyl phosphite (three hundred and ten grams), methanol (one hundred and sixty grams), and phosphorus acid (two grams). Methanol (one hundred and forty-nine grams) and cyclohexane (two hundred and fifty-one grams) were added to the product flask. Both the reaction flask and the product flask were heated to maintain a rapid continuous recycling of methanol and methanol-azeotrope former throughout the system. The body temperature of the reaction flask was held at one hundred degrees centigrade and after four hours of recycling of the methanol and cyclohexane azeotrope there remained in the product flask four hundred and fifty-four grams of a mixture that contained about 15.3 percent of trimethyl phosphite. This represented a conversion of triphenyl phosphite and co-distillation of trimethyl phosphite from the reaction vessel of about fifty-six percent of the theoretical yield of trimethyl phosphite.

*Example 40*

To the reaction flask of the apparatus of Example 4 was added a charge of triphenyl phosphite (232.5 grams) and methanol (75.5 grams). Methanol (seventy-four grams, cyclohexane (one hundred and twenty-six grams) and sodium (one-tenth of a gram) were added to the product flask. Both the reaction flask and the product flask were heated to maintain a rapid continuous recycling of methanol and cyclohexane throughout the system. The liquid temperature of the reaction flask was maintained at one hundred degrees centigrade and after recycling time of about twenty-one hours there was found in the product vessel a mixture that contained about 80.6 percent of the theoretically available phosphorus as trimethyl phosphite.

*Example 41*

The procedure of Example 1 was repeated with the exception that the trimethyl phosphite mixture was obtained by the reaction of three moles of methanol with phosphorus trichloride in the presence of an excess of triethylamine and methanol. The reaction flask then theoretically contained trimethyl phosphite (one hundred and twenty-four grams), triethylamine hydrochloride (412.5 grams), methanol (five hundred grams) and triethylamine (twenty grams). With the temperature of the liquid in the reaction flask held at seventy-five degrees centigrade a total of five hundred and eighty-nine grams of methanol was added to the reaction flask over a period of two hours and ten minutes. A co-distillate of methanol and trimethyl phosphite equal to eight hundred and sixty-six grams was obtained. This co-distillate contained about 91.6 percent of the theoretically available trimethyl phosphite.

For purposes of comparison a procedure similar to the batch technique of Example 1 was employed using a five-liter flask. Triphenyl phosphite (three thousand, four hundred and ten grams), methanol (seven hundred and ninety-two grams) and sodium (eleven grams) were added to the flask. The proportion of methanol was equivalent to a molar ratio of methanol to triphenyl phosphite of about 2.5:1. The reactants were heated to a temperature of one hundred degrees centigrade at atmospheric temperature with stirring. The pressure was gradually reduced, until a final pot temperature of ninety-four degrees centigrade at fifty-eight millimeters of mercury was attained. The condensate weighed six hundred and ninety-five grams having a trimethyl phosphite concentration of about 56.8 percent. Of the phosphorus charged to the system as triphenyl phosphite, only about twenty-nine percent was recovered as trimethyl phosphite. This comparative test demonstrated that unless sufficient methanol is present during distillation to co-distill with the trimethyl phosphite, a poor yield of trimethyl phosphite is obtained.

It will be recognized by those skilled in the art that various modifications within the invention are possible, some of which have been referred to above. Therefore, we do not wish to be limited except as defined by the appended claims.

We claim:

1. The process which comprises admixing methanol with a reaction mixture comprising trimethyl phosphite contaminated with its reactants and by-products from which it was made, and distilling from the reaction mixture a vapor phase containing trimethyl phosphite and methanol.

2. The process for recovering trimethyl phosphite which comprises admixing methanol with a mixture containing trimethyl phosphite and a phenol, and distilling from the resulting mixture a vapor phase containing trimethyl phosphite and methanol.

3. The process of claim 2 wherein the weight ratio of methanol to trimethyl phosphite in the mixture is between about 0.2:1 and about 80:1.

4. The process of claim 2 wherein said vapor phase containing trimethyl phosphite and methanol is admixed with a methanol azeotrope-former, the resulting mixture of methanol, methanol azeotrope-former, and trimethyl phosphite is distilled to yield a vapor phase containing methanol and methanol azeotrope-former, and substantially pure trimethyl phosphite is recovered as the distillation residue.

5. The process of claim 4 wherein said methanol azeotrope-former is selected from the group consisting of benzene, toluene, octanes, hexanes, cyclohexane, acetonitrile, ethyl nitrate, methyl borate, acetone, methyl acetate, thiophene, cyclopentane, methyl cyclopentane, 2,2,4-trimethyl pentane, methyl cyclohexane, cyclopentene, n-pentane, heptenes, and dipropyl ether.

6. The process for recovering trimethyl phosphite which comprises admixing methanol with an aryl-substituted phosphite to yield a transesterification mixture containing trimethyl phosphite, admixing methanol with said transesterification mixture, and distilling from the resulting mixture a vapor phase containing trimethyl phosphite and methanol.

7. The process of claim 6 wherein said aryl-substituted phosphite is selected from the group consisting of aryldimethyl phosphites, diarylmethyl phosphites, triaryl phosphites, and mixtures thereof.

8. The process of claim 6 wherein said methanol is admixed with said aryl-substituted phosphite in the presence of a basic catalyst to yield said transesterification mixture.

9. The process of claim 8 wherein said basic catalyst is selected from the group consisting of sodium hydride, potassium hydride, lithium hydride, sodium borohydride, lithium aluminum hydride, sodium sulfide, sodium hydroxide, lithium sulfide, potassium sulfide, sodium methylate, sodium phenolate, potassium phenolate, butyl lithium, phenyl sodium, aluminum isopropoxide, sodium methylate, potassium methylate, diethyl aniline, sodium cetylates, sodium octadecylates, quinoline, monododecyl monomethyl amine, diethyl aniline, pyridine, monododecyl dimethyl amine, sodium methylate, and lithium methylate.

10. The process of claim 6 wherein the proportion of said methanol admixed with said transesterification mixture is equivalent to a weight ratio of methanol to trimethyl phosphite in the transesterification mixture of between about 0.2:1 and about 80:1.

11. The process for recovering trimethyl phosphite which comprises admixing methanol, an aryl-substituted phosphite, and a small but effective amount of a basic catalyst to yield a transesterification mixture containing trimethyl phosphite and a phenol, the proportion of methanol added being sufficient to co-distill with trimethyl phosphite present in the transesterification mixture under the distillation conditions thereafter employed, distilling said transesterification mixture to yield a vapor phase containing trimethyl phosphite and methanol, continuously adding methanol to the transesterification mixture as distillation progresses, collecting said vapor phase, and continuing said distillation, said methanol addition, and said collection until substantially all of said trimethyl phosphite has been separated from the transesterification mixture.

12. The process of claim 11 wherein the proportion of said basic catalyst is equivalent to between about 0.001 and about 0.2 mole per mole of said aryl-substituted phosphite.

13. The process of claim 11 wherein said basic catalyst is selected from the group consisting of sodium hydride, potassium hydride, lithium hydride, sodium borohydride, lithium aluminum hydride, sodium sulfide, sodium hydroxide, lithium sulfide, potassium sulfide, sodium methylate, sodium phenolate, potassium phenolate, butyl lithium, phenyl sodium, aluminum isopropoxide, sodium methylate, potassium methylate, diethyl aniline, sodium cetylates, sodium octadecylates, quinoline, monododecyl monomethyl amine, diethyl aniline, pyridine, monododecyl dimethyl amine, sodium methylate, and lithium methylate.

14. The process of claim 11 wherein the proportion of methanol added to the transesterification mixture to effect co-distillation with the trimethyl phosphite is equivalent to a weight ratio of methanol to trimethyl phosphite of between about 0.2:1 and about 80:1.

15. The process of claim 11 wherein said vapor phase containing trimethyl phosphite and methanol is contacted with sulfur to yield trimethyl phosphorothionate, and a vapor phase predominating in methanol.

16. The process of claim 11 wherein said vapor phase containing trimethyl phosphite and methanol is admixed with a methanol azeotrope-former, the resulting mixture is then distilled to yield a vapor phase containing methanol and methanol azeotrope-former, and a liquid phase predominating in trimethyl phosphite.

17. The process of claim 16 wherein said methanol azeotrope-former is selected from the group consisting of benzene, toluene, octanes, hexanes, cyclohexane, acetonitrile, ethyl nitrate, methyl borate, acetone, methyl acetate, thiophene, cyclopentane, methyl cyclopentane, 2,2,4-trimethyl pentane, methyl cyclohexane, cyclopentene, n-pentane, heptenes, and dipropyl ether.

18. The process of claim 16 wherein the liquid phase predominating in trimethyl phosphite is contacted with an oxygen-containing gas in the presence of a metal catalyst selected from the group consisting of aluminum oxide, vanadium pentoxide, and mixtures thereof, and the resulting trimethyl phosphate is recovered.

19. The process of claim 16 wherein said liquid phase predominating in trimethyl phosphite is reacted with a compound selected from the group consisting of monohydric alcohol, polyhydric alcohol, and a phenol, each of which may contain halogen, nitro and other inert substituents, in the presence of a small effective amount of a basic catalyst to yield a corresponding tertiary phosphite.

20. The process for recovering trimethyl phosphite which comprises admixing methanol, an aryl-substituted phosphite, and a small but effective amount of a basic catalyst, heating the mixture to a temperature of between about 75 and 100 degrees Centigrade, to yield a transesterification mixture containing trimethyl phosphite and a phenol, the proportion of methanol added being sufficient to transesterify said aryl-substituted phosphite and to co-distill with the trimethyl phosphite present in the transesterification mixture under the distillation conditions thereafter employed, distilling said transesterification mixture to yield a vapor phase containing trimethyl phosphite and methanol, distilling said vapor phase to yield a methanol vapor phase depleted in trimethyl phosphite and a liquid phase of trimethyl phosphite depleted in methanol, recycling said methanol vapor phase to said transesterification mixture, continuing the distillation of said transesterification mixture and the recycling of said methanol vapor phase until substantially all of the trimethyl phosphite has been separated from the transesterification mixture, and recovering a liquid phase containing trimethyl phosphite.

21. The process of claim 20 wherein the proportion of said basic catalyst is equivalent to between about 0.001 and about 0.2 mole per mole of said aryl-substituted phosphite.

22. The process of claim 20 wherein said basic catalyst is selected from the group consisting of sodium hydride, potassium hydride, lithium hydride, sodium borohydride, lithium aluminum hydride, sodium sulfide, sodium hydroxide, lithium sulfide, potassium sulfide, sodium methylate, sodium phenolate, potassium phenolate, butyl lithium, phenyl sodium, aluminum isopropoxide, sodium methylate, potassium methylate, diethyl aniline, sodium cetylates, sodium octadecylates, quinoline, monododecyl monomethyl amine, diethyl aniline, pyridine, monododecyl dimethyl amine, sodium methylate, and lithium methylate.

23. The process of claim 20 wherein the proportion of methanol added to the transesterification mixture to effect co-distillation with the trimethyl phosphite is equivalent to a weight ratio of methanol to trimethyl phosphite of between about 0.2:1 and about 80:1.

24. The process of claim 20 wherein said vapor phase containing trimethyl phosphite and methanol is contacted with a methanol azeotrope-former, the resulting mixture is distilled to yield a liquid phase containing trimethyl phosphite and a vapor phase containing a mixture of methanol and the methanol azeotrope-former, and the vapor phase is recycled to the transesterification mixture.

25. The process of claim 24 wherein said azeotrope-former is selected from the group consisting of benzene, toluene, octanes, hexanes, cyclohexane, acetonitrile, ethyl nitrate, methyl borate, acetone, methyl acetate, thiophene, cyclopentane, methyl cyclopentane, 2,2,4-trimethyl pentane, methyl cyclohexane, cyclopentene, n-pentane, heptenes, and dipropyl ether.

26. The process of claim 20 wherein said liquid phase containing trimethyl phosphite is reacted with a compound selected from the group consisting of monohydric alcohol, polyhydric alcohol, and a phenol, each of which may contain halogen, nitro and other inert substituents, in the presence of a catalytic proportion of a basic catalyst to yield a corresponding tertiary phosphite.

27. The process of claim 26 wherein said compound is allyl alcohol, and said tertiary phosphite is triallyl phosphite.

28. The process of claim 20 wherein said liquid phase containing trimethyl phosphite is reacted with a methyl halide to yield dimethyl methylphosphonate and dimethyl hydrogen phosphite.

29. The continuous process for recovering trimethyl phosphite which comprises admixing methanol, an aryl-subsituted phosphite and a small but effective amount of a basic catalyst to yield a transesterification mixture containing trimethyl phosphite, methanol and a phenol, the proportion of methanol added being sufficient to transesterify said aryl-substituted phosphite and to co-distill with trimethyl phosphite present in the transesterification mixture under the distillation conditions thereafter employed, continuously feeding said transesterification mixture to a distillation zone whereby a vapor phase containing trimethyl phosphite and methanol is continuously formed and removed, and a portion of the liquid phase predominating in the phenolic by-products of the transesterification reaction is continuously removed from the distillation zone.

30. The process of claim 29 wherein said basic catalyst is selected from the group consisting of sodium hydride, potassium hydride, lithium hydride, sodium borohydride, lithium aluminum hydride, sodium sulfide, sodium hydroxide, lithium sulfide, potassium sulfide, sodium methylate, sodium phenolate, potassium phenolate, butyl lithium, phenyl sodium, aluminum isopropoxide, sodium methylate, potassium methylate, diethyl aniline, sodium cetylates, sodium octadecylates, quinoline, monododecyl monomethyl amine, diethyl aniline, pyridine, monododecyl dimethyl amine, sodium methylate, and lithium methylate.

31. The process of claim 29 wherein the proportion of methanol added to the transesterification mixture to effect co-distillation with the trimethyl phosphite is equivalent to a weight ratio of methanol to trimethyl phosphite of between about 0.2:1 and about 80.1.

32. The process of claim 29 wherein the trimethyl phosphite and methanol is continuously admixed with a methanol azeotrope-former, the resulting mixture is continuously distilled to yield a liquid phase containing trimethyl phosphite and a vapor phase containing a mixture of methanol and methanol azeotrope-former, and said vapor phase is continuously condensed.

33. The process of claim 32 wherein the condensate of methanol and methanol azeotrope-former is separated into a methanol fraction and a methanol azeotrope-former fraction, said methanol fraction is recycled to said transesterification mixture and said methanol azeotrope-former fraction is recycled to said mixture of trimethyl phosphite and methanol.

34. The continuous process for recovering trimethyl phosphite which comprises admixing methanol, an aryl-substituted phosphite and a small but effective amount of a basic catalyst to yield a transesterification mixture containing trimethyl phosphite, methanol and a phenol, the proportion of methanol added being sufficient to transesterify said aryl-substituted phosphite and to co-distill with trimethyl phosphite present in the transesterification mixture under the distillation conditions thereafter employed, continuously feeding said transesterification mixture to a first distillation zone whereby a vapor phase containing trimethyl phosphite and methanol is continuously formed and removed, condensing said vapor phase, collecting the resulting condensate, continuously distilling the resulting condensate in a second distillation zone to yield a methanol vapor phase depleted in trimethyl phosphite and a liquid phase of trimethyl phosphite depleted in methanol, continuously recycling said methanol vapor phase to said first distillation zone, continuously collecting a portion of said liquid phase of trimethyl phosphite and methanol, and continuously removing from the first distillation zone a portion of the liquid phase predominating in the phenolic by-products of the transesterification reaction.

35. The process which comprises admixing the co-distillate of the reaction mixture comprising trimethyl phosphite contaminated with its reactants and by-products from which it was made with said reaction mixture, and distilling from the reaction mixture a vapor phase containing trimethyl phosphite and said co-distillate.

36. The process of preparing derivatives of trimethyl phosphite which comprises admixing methanol and aryl substituted phosphites, and a small, effective amount of a basic catalyst to yield a transesterification mixture containing trimethyl phosphite and phenol, the proportion of methanol added being sufficient to co-distill with trimethyl phosphite present in the transesterification mixture under the distillation conditions thereafter employed, distilling said transesterification mixture to yield a vapor phase containing trimethyl phosphite and methanol, and continuously contacting said vapor phase containing trimethyl phosphite and methanol with an inorganic reactant material selected from the group consisting of sulfur, selenium, and oxygen to yield a compound selected from the group consisting of triethylphosphorothionate, triethylphosphoroselenonoate, and triethyl phosphate, respectively, and a vapor phase predominating in ethanol.

References Cited in the file of this patent

UNITED STATES PATENTS 2,970,166     Rosin et al. _____ Jan. 31, 1961

OTHER REFERENCES

Kosolapoff, "Organo-Phosphorus Compounds" (1950), John Wiley & Sons, Inc., New York, pp. 121, 235–236.

Hoffmann et al., "J. Am. Chem. Soc.," vol. 78, pp. 5817–5821.

Arbuzov et al., "Bull. Acad. Sci. U.S.S.R., Div. Chem. Sci." (English Translation), pp. 483–484 (1952).